(12) United States Patent
Chai et al.

(10) Patent No.: US 12,206,612 B2
(45) Date of Patent: Jan. 21, 2025

(54) REFERENCE SIGNAL INDICATION METHOD AND APPARATUS

(71) Applicant: HUAWEI TECHNOLOGIES CO., LTD., Shenzhen (CN)

(72) Inventors: Xiaomeng Chai, Shanghai (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

(21) Appl. No.: 17/672,135

(22) Filed: Feb. 15, 2022

(65) Prior Publication Data
US 2022/0173859 A1 Jun. 2, 2022

Related U.S. Application Data

(63) Continuation of application No. PCT/CN2020/109369, filed on Aug. 14, 2020.

(30) Foreign Application Priority Data

Aug. 16, 2019 (CN) .......................... 201910760402.4

(51) Int. Cl.
*H04L 5/00* (2006.01)
*H04B 7/06* (2006.01)
(Continued)

(52) U.S. Cl.
CPC .......... *H04L 5/0048* (2013.01); *H04B 7/0695* (2013.01); *H04W 72/542* (2023.01); *H04W 74/0833* (2013.01)

(58) Field of Classification Search
CPC ... H04L 5/0048; H04L 5/0023; H04L 5/0053; H04L 5/0094; H04L 5/005; H04L 5/0005;
(Continued)

(56) References Cited

U.S. PATENT DOCUMENTS

2017/0099090 A1* 4/2017 Liu .......................... H04L 1/06
2017/0302420 A1* 10/2017 Lu .......................... H04B 7/024
(Continued)

FOREIGN PATENT DOCUMENTS

CN 107197516 A 9/2017
CN 107888249 A 4/2018
(Continued)

OTHER PUBLICATIONS

Extended European Search Report issued in corresponding European Application No. 20853933.8, dated Sep. 12, 2022, pp. 1-30.
(Continued)

*Primary Examiner* — Kwang B Yao
*Assistant Examiner* — Syed M Bokhari
(74) *Attorney, Agent, or Firm* — HAUPTMAN HAM, LLP

(57) ABSTRACT

A reference signal indication method includes receiving a plurality of reference signals, and sending at least one codeword on a first time-frequency resource. The at least one codeword includes a first codeword. The first codeword corresponds to a first reference signal in N reference signals of the plurality of reference signals. The first reference signal is a selected reference signal. The N reference signals are a subset of the plurality of reference signals, and N is a positive integer.

16 Claims, 7 Drawing Sheets

(51) Int. Cl.
*H04W 72/542* (2023.01)
*H04W 74/0833* (2024.01)

(58) Field of Classification Search
CPC ... H04B 7/0695; H04B 7/088; H04W 72/542; H04W 74/0833
USPC .......................................................... 370/329
See application file for complete search history.

(56) References Cited

U.S. PATENT DOCUMENTS

| | | | |
|---|---|---|---|
| 2018/0019843 A1* | 1/2018 | Papasakellariou | .... H04L 1/1864 |
| 2018/0027594 A1 | 1/2018 | Nagaraja et al. | |
| 2018/0212651 A1 | 7/2018 | Li et al. | |
| 2019/0110300 A1 | 4/2019 | Chen et al. | |
| 2019/0215136 A1* | 7/2019 | Zhou | .................... H04L 1/1819 |
| 2019/0297603 A1* | 9/2019 | Guo | .................... H04B 7/0695 |
| 2020/0059290 A1 | 2/2020 | Pan et al. | |
| 2020/0136704 A1* | 4/2020 | Liu | ..................... H04B 7/0469 |

FOREIGN PATENT DOCUMENTS

| | | |
|---|---|---|
| CN | 108134624 A | 6/2018 |
| CN | 108282310 A | 7/2018 |
| CN | 109076556 A | 12/2018 |
| CN | 109511156 A | 3/2019 |
| CN | 109565714 A | 4/2019 |
| CN | 109565888 A | 4/2019 |
| CN | 109863813 A | 6/2019 |
| WO | 2018085601 A1 | 5/2018 |
| WO | 2019013996 A1 | 1/2019 |
| WO | 2019082152 A1 | 5/2019 |

OTHER PUBLICATIONS

Ericsson, Remaining details on NR-RACH configurations and formats. 3GPP TSG RAN WG1 NR Ad-Hoc#3 , Nagoya, Japan, Sep. 18-21, 2017, R1-1716154, 16 pages.
International Search Report issued in corresponding International Application No. PCT/CN2020/109369, dated Oct. 28, 2020, pp. 1-13.
Chinese Office Action issued in corresponding Chinese Application No. 201910760402.4, dated Jul. 14, 2021, pp. 1-27.

* cited by examiner

Preamble preamble #29 in 30
preambles associated with the SSB #1

REFERENCE SIGNAL INDICATION METHOD AND APPARATUS

CROSS-REFERENCE TO RELATED APPLICATIONS

This application is a continuation of International Application No. PCT/CN2020/109369, filed on Aug. 14, 2020, which claims priority to Chinese Patent Application No. 201910760402.4, filed on Aug. 16, 2019. The disclosures of the aforementioned applications are hereby incorporated by reference in their entireties.

TECHNICAL FIELD

Embodiments of this application relate to the field of communication technologies, and in particular, to a reference signal indication method and an apparatus.

BACKGROUND

In high frequency communication, a path loss is very severe. Therefore, a beamforming (beamforming) technology is usually used for transmission of signals in one direction to compensate for the severe path loss. Because beams are directional, both communication parties need to learn of a direction in which beams can be aligned with each other, to obtain better beam performance. In an existing 5th generation (5th generation, 5G) new radio (new radio, NR) communication system, a terminal selects an initial beam in a random access process, and notifies a network device of the selected beam. The network device sends data to the terminal on the beam selected by the terminal, so that a better beam gain can be obtained. In a conventional technology, the network device sends a synchronization signal block (SS/PBCH block, SSB) in a beam scanning manner, and may send one SSB for each beam. The terminal detects a plurality of SSBs, selects any SSB with a reference signal received power (reference signal received power, RSRP) greater than or equal to a threshold, and notifies the network device of the selected SSB in a random access process. In this way, the network device can learn of a beam corresponding to the SSB selected by the terminal.

The network device sends a broadcast message to the terminal in advance. The terminal determines, based on the broadcast message, an association relationship between an SSB and a physical random access channel (physical random access channel, PRACH) time-frequency resource and a random access preamble (preamble). The terminal sends, on a PRACH time-frequency resource associated with any SSB with an RSRP greater than or equal to the threshold, a preamble associated with the SSB. The network device determines, based on a detected preamble sequence and a PRACH time-frequency resource on which the preamble sequence is located, the SSB selected by the terminal.

Currently, to reduce a data transmission latency, data may be carried in the random access process. How to improve a beam gain of data transmission in the random access process is a problem that needs to be resolved.

SUMMARY

Embodiments of this application provides a reference signal indication method and an apparatus to improve a beam gain of data transmission in a random access process.

Specific technical solutions provided in the embodiments of this application are as follows: According to a first aspect, a reference signal indication method is provided. The method may be performed by a terminal device. The method specifically includes: receiving a plurality of reference signals; and sending at least one codeword on a first time-frequency resource, where the at least one codeword may be one or more codewords. The at least one codeword includes a first codeword, the first codeword has a correspondence with a to-be-reported first reference signal in N reference signals, and the N reference signals are a subset of the plurality of reference signals. A meaning of the subset includes: The N reference signals may be less than a quantity of the plurality of reference signals, or the N reference signals may be equal to a quantity of the plurality of reference signals. N is a positive integer. In this way, the first codeword is used to indicate a to-be-reported reference signal. When receiving the first codeword, a network device can determine, based on the first codeword, a reference signal selected by the terminal, and perform transmission of data based on a beam corresponding to the reference signal, so as to improve a beam direction gain. For example, in a scenario in which the first time-frequency resource is a random access time-frequency resource, the codeword may be a preamble, and a high beam gain can be obtained by indicating a reference signal with a large receive power in a random access process. In addition, fine selection of the reference signal does not need to be completed after the terminal enters a connected mode. Therefore, selection and reporting can be completed more quickly. In a possible design, the to-be-reported reference signal may be a reference signal with a largest receive power.

In a possible design, the first time-frequency resource has a correspondence with a second reference signal with a receive power greater than or equal to a threshold in the plurality of reference signals. The threshold may be specified in advance based on a requirement, or may be configured by the network device. The second reference signal may be any reference signal with a receive power greater than or equal to the threshold. A low latency can be obtained by sending a codeword on the first time-frequency resource corresponding to the second reference signal. In actual application, a case in which no reference signal with a receive power greater than or equal to the threshold exists may occur. In this case, a reference signal may be selected randomly, and the first time-frequency resource has a correspondence with the randomly selected reference signal.

Optionally, the first reference signal may be the same as the second reference signal. For example, the first reference signal is the to-be-reported reference signal.

In a possible design, the first codeword corresponding to the first reference signal is determined based on correspondences between the N reference signals and M codewords, where the M codewords are a subset of codewords associated with the first time-frequency resource, and M is a positive integer. By establishing the correspondences between the N reference signals and the M codewords, the N reference signals can be implicitly indicated by using the M codewords. For example, the first reference signal is indicated by using the first codeword.

In a possible design, the first time-frequency resource corresponding to the second reference signal is determined based on correspondences between N1 reference signals and P time-frequency resources, where N1 and P are positive integers, and the N1 reference signals include the plurality of reference signals. The first time-frequency resource is one of the P time-frequency resources. By using the correspondences between the N1 reference signals and the P time-frequency resources, a time-frequency resource on which a codeword is sent can be determined based on any reference signal with a receive power greater than or equal to the threshold.

Optionally, the N1 reference signals are reference signals of beams actually sent in a cell or are the plurality of reference signals.

In a possible design, the N reference signals are all candidate reference signals of a cell, the N reference signals are reference signals actually sent in a cell, the N reference signals are a subset of all candidate reference signals of a cell, or the N reference signals are a subset of reference signals actually sent in a cell.

In a possible design, the at least one codeword further includes a second codeword. The sending at least one codeword on a first time-frequency resource includes: sending the first codeword and the second codeword on the first time-frequency resource. In this way, the second codeword may have a normal codeword function, and the first codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, the first codeword and the second codeword belong to different codeword sets. To be specific, the first codeword belongs to a codeword set a, and a second codeword belongs to a codeword set b. The codeword set a and the codeword set b are both associated with the first time-frequency resource.

In a possible design, M<N, the N reference signals belong to a plurality of reference signal groups, each reference signal belongs to only one reference signal group, and the first codeword corresponds to a reference signal group in which the first reference signal is located. M<N, and the M codewords are insufficient to correspond to the N reference signals one by one. Therefore, the N reference signals may be grouped, so that the M codewords indicate all the N reference signals. Optionally, M<N, and one codeword corresponds to a plurality of reference signals, where angles between beam directions of the plurality of reference signals are less than a threshold.

In a possible design, the method further includes: sending a third codeword on a second time-frequency resource associated with the first time-frequency resource, where the third codeword has a correspondence with the first reference signal in the reference signal group. In this way, the third codeword can indicate a reference signal in the reference signal group, so that the first codeword and the third codeword can be associated with each other and are in a one-to-one correspondence with the N reference signals. The selected reference signal can be indicated more precisely. The network device can determine the reference signal selected by the terminal more precisely to obtain a more precise and larger beam direction gain.

In a possible design, the third codeword corresponding to the first reference signal in the codeword group is determined based on correspondences between reference signals in the reference signal group in which the first reference signal is located and codewords in a codeword group. In this manner, when one codeword resource is insufficient, more reference signals can be jointly indicated by using another codeword resource. A reference signal set indicated in this manner may be a plurality of reference signals received by the terminal from the network device, may be a plurality of reference signals actually sent by the network device, may be a subset of reference signals actually sent by the network device, may be all candidate reference signals of a cell, or may be a subset of all candidate reference signals of a cell. More reference signals can be indicated in the joint indication manner. Therefore, such a manner can help indicate all the candidate reference signals of the cell.

According to a second aspect, a reference signal indication method is provided. The method may be performed by a terminal device. The method specifically includes: receiving a plurality of reference signals; and sending a first codeword on a first time-frequency resource, and sending a second codeword on a second time-frequency resource associated with the first time-frequency resource, where the second codeword has a correspondence with a to-be-reported second reference signal in N reference signals, the N reference signals are a subset of the plurality of reference signals, and N is a positive integer. A meaning of the subset includes: The N reference signals may be less than a quantity of the plurality of reference signals, or the N reference signals may be equal to a quantity of the plurality of reference signals. N is a positive integer. In this way, the second codeword is used to indicate a to-be-reported reference signal. When receiving the second codeword, a network device can determine, based on the second codeword, a reference signal selected by the terminal, and perform transmission of data based on a beam corresponding to the reference signal, so as to improve a beam direction gain. For example, in a scenario in which the first time-frequency resource is a random access time-frequency resource, the first codeword may be a preamble. The second time-frequency resource associated with the first time-frequency resource may be a random access time-frequency resource or a PUSCH time-frequency resource. In this way, a high beam gain can be obtained by indicating a reference signal with a large receive power in a random access process. In addition, fine selection of the reference signal does not need to be completed after the terminal enters a connected mode. Therefore, selection and reporting can be completed more quickly.

In a possible design, the second reference signal may be a reference signal with a largest receive power in the N reference signals.

In a possible design, the first time-frequency resource has a correspondence with a first reference signal with a receive power greater than or equal to a threshold in the plurality of reference signals. The threshold may be specified in advance based on a requirement, or may be configured by the network device. The second reference signal may be any reference signal with a receive power greater than or equal to the threshold. A low latency can be obtained by sending a codeword on the first time-frequency resource corresponding to the second reference signal. In actual application, receive powers of all received reference signals may be less than or equal to the threshold. In this case, a reference signal may be selected randomly, and the first time-frequency resource has a correspondence with the randomly selected reference signal.

Optionally, the first reference signal is the same as the second reference signal. For example, the first reference signal is the to-be-reported reference signal.

Optionally, the first time-frequency resource and the second time-frequency resource may be continuous or discontinuous in time domain. The first time-frequency resource and the second time-frequency resource are time-division multiplexed in time domain, and may be the same or different in frequency domain.

In a possible design, the first codeword is a first preamble, and the second codeword is a second preamble. Alternatively, the first codeword is a preamble, and the second codeword is a demodulation reference signal DMRS. In this way, the first codeword may have a normal codeword function, and the second codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, the first time-frequency resource and the second time-frequency resource are both physical random access channel PRACH resources. Alternatively, the first time-frequency resource is a PRACH resource, and the second time-frequency resource is a physical uplink shared channel PUSCH resource, for example, a PRACH resource and a PUSCH resource in an msg A resource in a two-step of random access process.

In a possible design, the second codeword is a DMRS. That the DMRS has a correspondence with the second reference signal includes: A sequence of the DMRS has a correspondence with the second reference signal, a port of the DMRS has a correspondence with the second reference signal, or the sequence of the DMRS and the port of the DMRS both have a correspondence with the second reference signal. In this way, a selected reference signal may be indicated by using the sequence and/or the port of the DMRS.

In a possible design, the second codeword corresponding to the second reference signal is determined based on correspondences between the N reference signals and M codewords, where the M codewords are a subset of codewords associated with the second time-frequency resource, and M is a positive integer. By establishing the correspondences between the N reference signals and the M codewords, the N reference signals can be implicitly indicated by using the M codewords. For example, the second reference signal is indicated by using the second codeword.

In a possible design, the first time-frequency resource corresponding to the first reference signal and the first codeword corresponding to the first reference signal are determined based on correspondences between N1 reference signals and P time-frequency resources and M1 codewords, where N1, P, and M1 are positive integers. By using the correspondences between the N1 reference signals and the P time-frequency resources, a time-frequency resource on which a codeword is sent can be determined based on any reference signal with a receive power greater than or equal to the threshold.

In a possible design, the N reference signals are all candidate reference signals of beams of a cell, the N reference signals are reference signals of beams actually sent in a cell, the N reference signals are a subset of all candidate reference signals of beams of a cell, or the N reference signals are a subset of reference signals of beams actually sent in a cell.

In a possible design, M<N, the N reference signals belong to a plurality of reference signal groups, each reference signal belongs to only one reference signal group, and the second codeword corresponds to a reference signal group in which the second reference signal is located. M<N, and the M codewords are insufficient to correspond to the N reference signals one by one. Therefore, the N reference signals may be grouped, so that the M codewords indicate all the N reference signals. Optionally, M<N, and one codeword corresponds to a plurality of reference signals, where angles between beam directions of the plurality of reference signals are less than a threshold.

According to a third aspect, a reference signal indication method is provided. The method may be performed by a network device. The method includes: sending a plurality of reference signals to a terminal; receiving, on a first time-frequency resource, a first codeword sent by the terminal; and sending data to the terminal on a beam corresponding to a first reference signal corresponding to the first codeword. A meaning of the subset includes: The N reference signals may be less than a quantity of the plurality of reference signals, or the N reference signals may be equal to a quantity of the plurality of reference signals. In this way, when receiving the first codeword, the network device can determine, based on the first codeword, a reference signal selected by the terminal, and perform transmission of data based on a beam corresponding to the reference signal, so as to improve a beam direction gain.

In a possible design, the first codeword has a correspondence with the first reference signal in the N reference signals, the N reference signals are a subset of the plurality of reference signals, and N is a positive integer. Optionally, the first reference signal is a reference signal with the largest receive power of the terminal in the N reference signals.

In a possible design, the first time-frequency resource has a correspondence with a second reference signal with a receive power greater than or equal to a threshold in the plurality of reference signals. The threshold may be specified in advance based on a requirement. The second reference signal may be any reference signal with a receive power greater than or equal to the threshold. A low latency can be obtained by receiving a codeword on the first time-frequency resource corresponding to the second reference signal. In actual application, a case in which no reference signal with a receive power greater than or equal to the threshold exists may occur. In this case, a reference signal may be selected randomly, and the first time-frequency resource has a correspondence with the randomly selected reference signal.

In a possible design, the method further includes: determining, based on correspondences between the N reference signals and M codewords, the first reference signal corresponding to the first codeword, where the M codewords are a subset of codewords associated with the first time-frequency resource, and M is a positive integer. By establishing the correspondences between the N reference signals and the M codewords, the N reference signals can be implicitly indicated by using the M codewords. For example, the first reference signal is indicated by using the first codeword.

In a possible design, the method further includes: the N reference signals are all candidate reference signals of a cell, the N reference signals are reference signals actually sent in a cell, the N reference signals are a subset of all candidate reference signals of a cell, or the N reference signals are a subset of reference signals actually sent in a cell.

In a possible design, a second codeword sent by the terminal is received on the first time-frequency resource. The second codeword and the first codeword belong to different codeword sets. In this way, the second codeword may have a normal codeword function, and the first codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, a third codeword is received on a second time-frequency resource, and the first time-frequency resource associated with the second time-frequency resource is determined.

In a possible design, the method further includes: determining a first reference signal group corresponding to the first codeword; and determining, based on correspondences between reference signals in the first reference signal group and codewords in a first codeword group, the first reference signal corresponding to the third codeword in the first reference signal group; or determining a second reference signal group corresponding to the third codeword; and determining, based on correspondences between reference signals in the second reference signal group and codewords in a second codeword group, the first reference signal corresponding to the first codeword in the second reference signal group. In this manner, when one codeword resource is insufficient, more reference signals can be jointly indicated by using another codeword resource. A reference signal set indicated in this manner may be a plurality of reference signals received by the terminal from the network device, may be a plurality of reference signals actually sent by the network device, may be a subset of reference signals actually sent by the network device, may be all candidate reference signals of a cell, or may be a subset of all candidate reference signals of a cell. More reference signals can be indicated in the joint indication manner. Therefore, such a manner can help indicate all the candidate reference signals of the cell.

According to a fourth aspect, an apparatus is provided. The apparatus may be a terminal device, may be an apparatus (for example, a chip, a chip system, or a circuit) in a terminal device, or may be an apparatus that can be used with a terminal device. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example:

the communication module is configured to: receive a plurality of reference signals, and send at least one codeword on a first time-frequency resource, where the at least one codeword may be one or more codewords. The at least one codeword includes a first codeword, the first codeword has a correspondence with a to-be-reported first reference signal in N reference signals, and the N reference signals are a subset of the plurality of reference signals.

In a possible design, the first reference signal is a reference signal with a largest receive power in the N reference signals.

In a possible design, the first time-frequency resource has a correspondence with a second reference signal with a receive power greater than or equal to a threshold in the plurality of reference signals. Optionally, the first reference signal is the same as the second reference signal.

In a possible design, the processing module is configured to determine, based on correspondences between the N reference signals and M codewords, the first codeword corresponding to the first reference signal, where the M codewords are a subset of codewords associated with the first time-frequency resource, and M is a positive integer. By establishing the correspondences between the N reference signals and the M codewords, the N reference signals can be implicitly indicated by using the M codewords. For example, the first reference signal is indicated by using the first codeword.

In a possible design, the processing module is configured to determine, based on correspondences between N1 reference signals and P time-frequency resources, the first time-frequency resource corresponding to the second reference signal, where N1 and P are positive integers, and the N1 reference signals include the plurality of reference signals. By using the correspondences between the N1 reference signals and the P time-frequency resources, a time-frequency resource on which a codeword is sent can be determined based on any reference signal with a receive power greater than or equal to the threshold. The threshold may be specified in advance based on a requirement, or may be configured by the network device.

In a possible design, the processing module is configured to determine, based on correspondences between N1 reference signals and P time-frequency resources, the first time-frequency resource corresponding to the second reference signal, where N1 and P are positive integers, and the N1 reference signals include the plurality of reference signals. By using the correspondences between the N1 reference signals and the P time-frequency resources, a time-frequency resource on which a codeword is sent can be determined based on any reference signal with a receive power greater than or equal to the threshold.

Optionally, the N1 reference signals are reference signals of beams actually sent in a cell or are the plurality of reference signals.

In a possible design, the at least one codeword further includes a second codeword. The communication module is specifically configured to send the first codeword and the second codeword on the first time-frequency resource. In this way, the second codeword may have a normal codeword function, and the first codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, the first codeword and the second codeword belong to different codeword sets. To be specific, the first codeword belongs to a codeword set a, and a second codeword belongs to a codeword set b. The codeword set a and the codeword set b are both associated with the first time-frequency resource.

In a possible design, M<N, the N reference signals belong to a plurality of reference signal groups, each reference signal belongs to only one reference signal group, and the first codeword corresponds to a reference signal group in which the first reference signal is located. M<N, and the M codewords are insufficient to correspond to the N reference signals one by one. Therefore, the N reference signals may be grouped, so that the M codewords indicate all the N reference signals. Optionally, M<N, and one codeword corresponds to a plurality of reference signals, where angles between beam directions of the plurality of reference signals are less than a threshold.

In a possible design, the communication module is further configured to send a third codeword on a second time-frequency resource associated with the first time-frequency resource, where the third codeword has a correspondence with the first reference signal in the reference signal group. In this way, the third codeword can indicate a reference signal in the reference signal group, so that the first codeword and the third codeword can be associated with each other and are in a one-to-one correspondence with the N reference signals. The selected reference signal can be indicated more precisely. The network device can determine the reference signal selected by the terminal more precisely to obtain a more precise and larger beam direction gain.

In a possible design, the processing module is further configured to determine, based on correspondences between reference signals in the reference signal group and codewords in a codeword group, the third codeword corresponding to the first reference signal in the codeword group. In this manner, when one codeword resource is insufficient, more reference signals can be jointly indicated by using another codeword resource. A reference signal set indicated in this manner may be a plurality of reference signals received by the terminal from the network device, may be a plurality of reference signals actually sent by the network device, may be a subset of reference signals actually sent by the network device, may be all candidate reference signals of a cell, or may be a subset of all candidate reference signals of a cell. More reference signals can be indicated in the joint indication manner. Therefore, such a manner can help indicate all the candidate reference signals of the cell.

According to a fifth aspect, an apparatus is provided. The apparatus may be a terminal device, may be an apparatus (for example, a chip, a chip system, or a circuit) in a terminal device, or may be an apparatus that can be used with a terminal device. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example:

the communication module is configured to: receive a plurality of reference signals; and send a first codeword on a first time-frequency resource, and send a second codeword on a second time-frequency resource associated with the first time-frequency resource, where the second codeword has a correspondence with a to-be-reported second reference signal in N reference signals, the N reference signals are a subset of the plurality of reference signals, and N is a positive integer. A meaning of the subset includes: The N reference signals may be less than a quantity of the plurality of reference signals, or the N reference signals may be equal to a quantity of the plurality of reference signals. N is a positive integer. In this way, the second codeword is used to indicate a to-be-reported reference signal. When receiving the second codeword, a network device can determine, based on the second codeword, a reference signal selected by the terminal, and perform transmission of data based on a beam corresponding to the reference signal, so as to improve a beam direction gain. For example, in a scenario in which the first time-frequency resource is a random access time-frequency resource, the first codeword may be a preamble. The second time-frequency resource associated with the first time-frequency resource may be a random access time-frequency resource or a PUSCH time-frequency resource. In this way, a high beam gain can be obtained by indicating a reference signal in a random access process. In addition, fine selection of the reference signal does not need to be completed after the terminal enters a connected mode. Therefore, selection and reporting can be completed more quickly.

In a possible design, the to-be-reported reference signal may be a reference signal with the largest receive power.

In a possible design, the first time-frequency resource has a correspondence with a first reference signal with a receive power greater than or equal to a threshold in the plurality of reference signals. The threshold may be specified in advance based on a requirement. The second reference signal may be any reference signal with a receive power greater than or equal to the threshold. A low latency can be obtained by sending a codeword on the first time-frequency resource corresponding to the second reference signal. In actual application, a case in which no reference signal with a receive power greater than or equal to the threshold exists may occur. In this case, a reference signal may be selected randomly, and the first time-frequency resource has a correspondence with the randomly selected reference signal.

Optionally, the first reference signal may be the same as the second reference signal. For example, the first reference signal is the to-be-reported reference signal.

Optionally, the first time-frequency resource and the second time-frequency resource may be continuous or discontinuous in time domain. The first time-frequency resource and the second time-frequency resource are time-division multiplexed, and may be continuous or discontinuous in frequency domain.

In a possible design, the first codeword is a first preamble, and the second codeword is a second preamble. Alternatively, the first codeword is a preamble, and the second codeword is a demodulation reference signal DMRS. In this way, the first codeword may have a normal codeword function, and the second codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, the first time-frequency resource and the second time-frequency resource are both physical random access channel PRACH resources. Alternatively, the first time-frequency resource is a PRACH resource, and the second time-frequency resource is a physical uplink shared channel PUSCH resource, for example, a PRACH resource and a PUSCH resource in an msg A resource in a two-step of random access process.

In a possible design, the second codeword is a DMRS. That the DMRS has a correspondence with the second reference signal includes: A sequence of the DMRS has a correspondence with the second reference signal, a port of the DMRS has a correspondence with the second reference signal, or the sequence of the DMRS and the port of the DMRS both have a correspondence with the second reference signal. In this way, a selected reference signal may be indicated by using the sequence and the port of the DMRS.

In a possible design, the processing module is configured to determine, based on correspondences between the N reference signals and M codewords, the second codeword corresponding to the second reference signal, where the M codewords are a subset of codewords associated with the second time-frequency resource, and M is a positive integer. By establishing the correspondences between the N reference signals and the M codewords, the N reference signals can be implicitly indicated by using the M codewords. For example, the second reference signal is indicated by using the second codeword.

In a possible design, the processing module is configured to determine, based on correspondences between N1 reference signals and P time-frequency resources and M1 codewords, the first time-frequency resource corresponding to the first reference signal and the first codeword corresponding to the first reference signal, where N1, P, and M1 are positive integers. By using the correspondences between the N1 reference signals and the P time-frequency resources, a time-frequency resource on which a codeword is sent can be determined based on any reference signal with a receive power greater than or equal to the threshold.

In a possible design, the N reference signals are all candidate reference signals of beams of a cell, the N reference signals are reference signals of beams actually sent in a cell, the N reference signals are a subset of all candidate reference signals of beams of a cell, or the N reference signals are a subset of reference signals of beams actually sent in a cell.

In a possible design, M<N, the second codeword corresponds to a reference signal group in which the second reference signal is located. M<N, and the M codewords are insufficient to correspond to the N reference signals one by one. Therefore, the N reference signals may be grouped, so that the M codewords indicate all the N reference signals. Optionally, M<N, and one codeword corresponds to a plurality of reference signals, where angles between beam directions of the plurality of reference signals are less than a threshold.

According to a sixth aspect, an apparatus is provided. The apparatus may be a network device, may be an apparatus (for example, a chip, a chip system, or a circuit) in a network device, or may be an apparatus that can be used with a network device. In a design, the apparatus may include modules that are in a one-to-one correspondence with the methods/operations/steps/actions described in the third aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example:

the communication module is configured to: send a plurality of reference signals to a terminal; receive a first codeword from the terminal on a first time-frequency resource, where the first codeword has a correspondence with a to-be-reported first reference signal in the N reference signals, the N reference signals are a subset of the plurality of reference signals, and N is a positive integer; and send data to the terminal on a beam corresponding to the first reference signal. A meaning of the subset includes: The N reference signals may be less than a quantity of the plurality of reference signals, or the N reference signals may be equal to a quantity of the plurality of reference signals. In this way, when receiving the first codeword, the network device can determine, based on the first codeword, a reference signal selected by the terminal, and perform transmission of data based on a beam corresponding to the reference signal, so as to improve a beam direction gain.

In a possible design, the to-be-reported reference signal may be a reference signal with the largest receive power.

In a possible design, the first time-frequency resource has a correspondence with a second reference signal with a receive power greater than or equal to a threshold in the plurality of reference signals. The threshold may be specified in advance based on a requirement. The second reference signal may be any reference signal with a receive power greater than or equal to the threshold. A low latency can be obtained by receiving a codeword on the first time-frequency resource corresponding to the second reference signal. In actual application, a case in which no reference signal with a receive power greater than or equal to the threshold exists may occur. In this case, a reference signal may be selected randomly, and the first time-frequency resource has a correspondence with the randomly selected reference signal.

In a possible design, the processing module is configured to determine, based on correspondences between the N reference signals and M codewords, the first reference signal corresponding to the first codeword, where the M codewords are a subset of codewords associated with the first time-frequency resource, and M is a positive integer. By establishing the correspondences between the N reference signals and the M codewords, the N reference signals can be implicitly indicated by using the M codewords. For example, the first reference signal is indicated by using the first codeword.

In a possible design, the N reference signals are all candidate reference signals of a cell, the N reference signals are reference signals actually sent in a cell, the N reference signals are a subset of all candidate reference signals of a cell, or the N reference signals are a subset of reference signals actually sent in a cell.

In a possible design, the communication module is further configured to receive a second codeword from the terminal on the first time-frequency resource. The second codeword and the first codeword belong to different codeword sets. In this way, the second codeword may have a normal codeword function, and the first codeword may be used to implicitly indicate a selected reference signal. In this case, a quantity of first codewords may be expanded based on a quantity of reference signals for which correspondences need to be established. Therefore, such a manner can help indicate all candidate reference signals of a cell. In addition, such a manner does not affect a normal function of an existing codeword.

In a possible design, a third codeword is received on a second time-frequency resource, and the first time-frequency resource associated with the second time-frequency resource is determined.

In a possible design, the processing module is further configured to: determine a first reference signal group corresponding to the first codeword; and determine, based on correspondences between reference signals in the first reference signal group and codewords in a first codeword group, the first reference signal corresponding to the third codeword in the first reference signal group; or is configured to: determine a second reference signal group corresponding to the third codeword; and determine, based on correspondences between reference signals in the second reference signal group and codewords in a second codeword group, the first reference signal corresponding to the first codeword in the second reference signal group. In this manner, when one codeword resource is insufficient, more reference signals can be jointly indicated by using another codeword resource. A reference signal set indicated in this manner may be a plurality of reference signals received by the terminal from the network device, may be a plurality of reference signals actually sent by the network device, may be a subset of reference signals actually sent by the network device, may be all candidate reference signals of a cell, or may be a subset of all candidate reference signals of a cell. More reference signals can be indicated in the joint indication manner. Therefore, such a manner can help indicate all the candidate reference signals of the cell.

According to a seventh aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or another type of communication interface, and the another device may be a network device. The processor is configured to invoke a group of programs, instructions, or data to perform the method according to the first aspect or the second aspect. The apparatus may further include a memory, configured to store the programs, the instructions, or the data invoked by the processor. The memory is coupled to the processor, and when executing the instructions or the data stored in the memory, the processor can implement the method described in the first aspect or the second aspect.

According to an eighth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or another type of communication interface, and the another device may be a terminal device. The processor is configured to invoke a group of programs, instructions, or data, to perform the method described in the third aspect. The apparatus may further include a memory, configured to store the programs, the instructions, or the data invoked by the processor. The memory is coupled to the processor, and when executing the instructions or the data stored in the memory, the processor can implement the method described in the third aspect.

According to a ninth aspect, an embodiment of this application further provides a computer-readable storage medium. The computer storage medium stores computer-readable instructions, and when the computer-readable instructions are run on a computer, the computer is enabled to perform the method according to any one of the first aspect or the possible designs of the first aspect.

According to a tenth aspect, an embodiment of this application further provides a computer-readable storage medium, including instructions. When the instructions are run on a computer, the computer is enabled to perform the method according to any one of the second aspect or the possible designs of the second aspect.

According to an eleventh aspect, an embodiment of this application further provides a computer-readable storage medium, including instructions. When the instructions are run on a computer, the computer is enabled to perform the method according to any one of the third aspect or the possible designs of the third aspect.

According to a twelfth aspect, an embodiment of this application provides a chip system. The chip system includes a processor, and may further include a memory, configured to implement the method according to any one of the first aspect or the possible designs of the first aspect. The chip system may include a chip, or may include a chip and another discrete device.

According to a thirteenth aspect, an embodiment of this application provides a chip system. The chip system includes a processor, and may further include a memory, configured to implement the method according to any one of the second aspect or the possible designs of the second aspect. The chip system may include a chip, or may include a chip and another discrete device.

According to a fourteenth aspect, an embodiment of this application provides a chip system. The chip system includes a processor, and may further include a memory, configured to implement the method according to any one of the third aspect or the possible designs of the third aspect. The chip system may include a chip, or may include a chip and another discrete device.

According to a fifteenth aspect, an embodiment of this application provides a system. The system includes the terminal device according to the fourth aspect or the fifth aspect and the network device according to the sixth aspect.

DESCRIPTION OF EMBODIMENTS

Embodiments of this application provide a reference signal indication method and an apparatus to indicate a to-be-reported reference signal to a network side and obtain a high beam gain. The method and the apparatus are based on a same technical concept. Because a problem-resolving principle of the method is similar to that of the apparatus, mutual reference may be made between implementation of the apparatus and implementation of the method, and no repeated description is provided. In descriptions of the embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. In this application, "at least one" means one or more, and "a plurality of" means two or more. In addition, it should be understood that, in the descriptions of this application, the terms such as "first", "second", and "third" are merely used for differentiation and description, but cannot be understood as an indication or implication of relative importance or an indication or implication of an order.

The reference signal indication method provided in the embodiments of this application may be applied to a 5th generation (5th generation, 5G) communication system, for example, 5G new radio (new radio, NR); or may be applied to various communication systems in the future. Specifically, for example, the method may be applied to an MTC communication scenario, an NB-IoT communication scenario, or any scenario of transmission of a small data packet.

The following describes in detail the embodiments of this application with reference to accompanying drawings.

Figure 1:
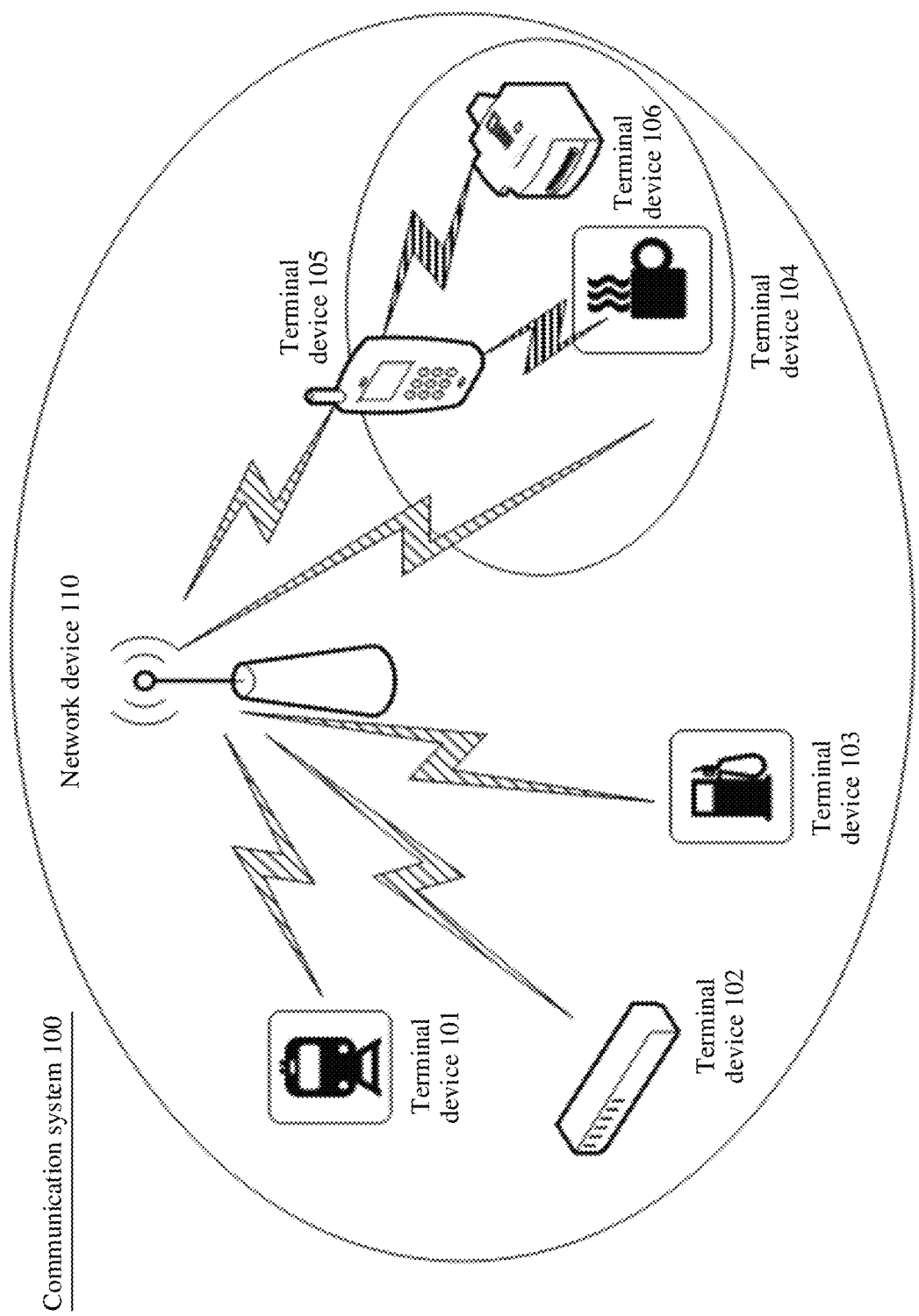
FIG. 1 is a schematic diagram of an architecture of a communication system according to an embodiment of this application.

FIG. 1 shows an architecture of a possible communication system to which a reference signal indication method provided in an embodiment of this application is applicable. The communication system 100 may include a network device 110 and a terminal device 101 to a terminal device 106. It should be understood that the communication system 100 may include more or fewer network devices or terminal devices. The network device or the terminal device may be hardware, may be software obtained through functional division, or may be a combination thereof. In addition, the terminal devices 104 to 106 may also form a communication system. For example, the terminal device 105 may send downlink data to the terminal device 104 or the terminal device 106. The network device or the terminal device may communicate with each other by using another device or network element. The network device 110 may send downlink data to the terminal devices 101 to 106, or may receive uplink data sent by the terminal devices 101 to 106. Certainly, the terminal devices 101 to 106 may alternatively send uplink data to the network device 110, or may receive downlink data sent by the network device 110.

The network device 110 is a node in a radio access network (radio access network, RAN), and may also be referred to as a base station, or may be referred to as a RAN node (or device). Currently, some examples of the access network device 101 are: a gNB/NR-NB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), a network device in a 5G communication system, and a network device in a possible communication system in the future.

The terminal devices 101 to 106 each may also be referred to as user equipment (user equipment, UE), a mobile station (mobile station, MS), a mobile terminal (mobile terminal, MT), or the like, and is a device that provides a user with voice or data connectivity, or may be an internet of things device. For example, the terminal devices 101 to 106 each include a handheld device, a vehicle-mounted device, or the like that has a wireless connection function. Currently, the terminal devices 101 to 106 each may be a mobile phone (mobile phone), a tablet computer, a notebook computer, a palmtop computer, a mobile internet device (mobile internet device, MID), a wearable device (for example, a smart-watch, a smart band, or a pedometer), a vehicle-mounted device (for example, an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an unmanned aerial vehicle, or an aircraft), or the like. This application is described by using a terminal.

In this embodiment of this application, a terminal sends a codeword on a time-frequency resource to notify a network device of a reference signal selected by the terminal. The selected reference signal may also be referred to as a to-be-reported reference signal. The reference signal is a signal that is sent by the network device and that is used to discover and measure another device or a signal that is sent by the network device and that is used for access of the terminal. The reference signal may be an SSB, or may be a channel state information reference signal (channel state information reference signal, CSI-RS). An example in which the reference signal is an SSB is used for description in the embodiments of this application. The network device may send an SSB on each transmit beam, in other words, the network device may use each transmit beam to send an SSB. The terminal measures the SSB sent by the network device, and determines a value of a beam direction gain in each direction based on a receive power of the SSB. For example, a threshold may be set; and for a beam corresponding to an SSB with a receive power greater than or equal to the threshold, it may be considered that a good beam gain has been obtained. For example, the to-be-reported reference signal is an SSB with a largest receive power. The method provided in the embodiments of this application aims to select a beam corresponding to the SSB with the largest receive power and notify the network device of the beam. Certainly, the method may further be expanded as selecting a beam corresponding to an SSB with a second largest receive power and notifying the network device of the beam, or selecting a beam corresponding to any one of the first x SSBs sorted in descending order of receive powers and notifying the network device of the beam. A value of x is any integer greater than or equal to 1, and may be set as required. In actual application, beams are generally in a one-to-one correspondence with reference signals. Therefore, the terminal and the network device reflect beam selection based on a reference signal. A receive power of a reference signal is a parameter reflecting strength of the reference signal. In this application, another parameter that can reflect strength of a reference signal may be used. For example, the receive power may be an RSRP.

Generally, the terminal selects an initial beam in a random access process, that is, may report the selected reference signal to the network device in the random access process. The network device sends data to the terminal on a beam corresponding to the reference signal selected by the terminal. That the network device sends data to the terminal on a beam corresponding to the reference signal selected by the terminal is reflected in that the terminal assumes that a reference signal antenna port used by the network device to send data to the terminal is quasi co-location (quasi co-location) with the reference signal selected by the terminal device. The random access process may be implemented by using different methods. For example, the random access process may include four steps. Specifically, the terminal sends a random access preamble (preamble) to the network device, the network device returns a random access response to the terminal, and the terminal sends a message 3 (Msg 3) to the network device, where the message 3 is a physical uplink shared channel (physical uplink shared channel, PUSCH). For another example, the random access process may alternatively include two steps. Specifically, the terminal sends a message A (msg A) to the network device, and the network device sends a message B to the terminal, where the message A includes two part. For example, if the message A includes a preamble sent on a physical random access channel (physical random access channel, PRACH) and a message sent on a PUSCH, the terminal may include uplink data in the message A. The terminal and the network device complete the random access procedure by using two steps of message sending and receiving. To reduce a data transmission latency, the message 3 or the msg A may carry the uplink data. In this way, the terminal can complete transmission of the uplink data in an idle mode and does not need to enter a connected mode.

Based thereupon, in this embodiment of this application, the terminal may send a preamble to the network device on a PRACH resource and indicate the selected reference signal by using the preamble, or may indicate the selected reference signal on a PUSCH resource by using a DMRS. The preamble and the DMRS may be collectively referred to as codewords. The terminal indicates the selected reference signal to the network device by using a sent codeword. The network device may determine, based on a detected codeword, a codeword selected by the terminal. For the two-step random access process, for ease of description, a time-frequency resource occupied by the msg A may be described as two parts, where a resource occupied by the preamble is a PRACH time-frequency resource (or a PRACH resource), and a resource occupied by the PUSCH is a PUSCH time-frequency resource (or a PUSCH resource). Generally, the DMRS is sent on a specified symbol in the PUSCH resource.

In the example descriptions of this application, the PRACH resource may be represented by using a PRACH transmission occasion (PRACH occasion, RO). One RO represents one time-frequency resource used for transmission of a preamble, includes one or more subcarriers in frequency domain, and includes one or more time domain symbols in time domain. The PUSCH resource may be represented by using a PUSCH transmission occasion (PUSCH occasion, PO). One PO represents one time-frequency resource used for transmission of a PUSCH, includes one or more subcarriers in frequency domain, and includes one or more time domain symbols in time domain.

Figure 2:
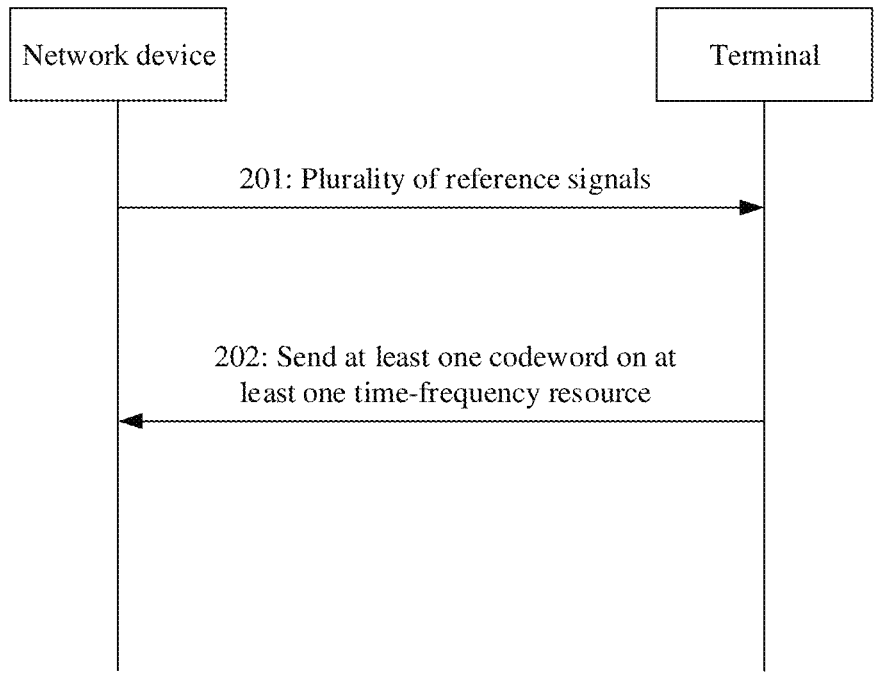
FIG. 2 is a schematic flowchart of a reference signal indication method according to an embodiment of this application.

FIG. 2 shows a procedure of a reference signal indication method according to an embodiment of this application, as shown below.

S201: A network device sends a plurality of reference signals to a terminal, and the terminal receives the plurality of reference signals from the network device.

The plurality of reference signals may correspond to a plurality of beams. In actual application, a quantity of reference signals sent by the network device may be greater than a quantity of reference signals received by the terminal.

S202: The terminal sends at least one codeword on at least one time-frequency resource, and the network device receives the at least one codeword on at least one time-frequency resource.

The sending at least one codeword on at least one time-frequency resource includes several cases:

Case 1: The at least one time-frequency resource is one time-frequency resource, and the at least one codeword is one codeword. The terminal sends one codeword on one time-frequency resource. The terminal implicitly indicates a to-be-reported reference signal to the network device by using the sent codeword. The network device determines, based on the received codeword, the reference signal reported by the terminal. In an embodiment, the to-be-reported reference signal may be a reference signal satisfying a preset condition among received reference signals. The preset condition may be, for example, a receive power is the largest; and correspondingly, the to-be-reported reference signal is a reference signal with the largest receive power. The preset condition may be pre-defined, or may be configured by the network device.

Case 2: The at least one time-frequency resource is one time-frequency resource, and the at least one codeword is a plurality of codewords. The terminal sends a plurality of codewords, for example, two codewords, on one time-frequency resource. The terminal implicitly indicates the to-be-reported reference signal by using one of two codewords. For example, the to-be-reported reference signal is a reference signal with a largest receive power. The network device determines, based on the received codeword, the reference signal selected by the terminal.

Case 3: The at least one time-frequency resource is a plurality of time-frequency resources, for example, may be two time-frequency resources; and the at least one codeword is a plurality of codewords, for example, two codewords. The terminal sends a plurality of codewords on a plurality of time-frequency resources. For example, the terminal sends one codeword on one time-frequency resource, and sends another codeword on another time-frequency resource. The terminal implicitly indicates the to-be-reported reference signal by using one codeword sent on one time-frequency resource. For example, the to-be-reported reference signal is a reference signal with a largest receive power. The network device determines, based on the received codeword, the reference signal selected by the terminal.

In this embodiment of this application, for ease of understanding of the method, in some descriptions related to reporting a reference signal, an example in which the reference signal to be reported by the terminal is a reference signal with a largest receive power in received reference signals is used.

In this case, on which time-frequency resources the terminal sends which code words to indicate the reference signal. The terminal needs to determine the to-be-sent codewords based on an agreed correspondence between a reference signal and a time-frequency resource and/or an agreed correspondence between a reference signal and a codeword. The at least one time-frequency resource includes a time-frequency resource A. The time-frequency resource A is a time-frequency resource corresponding to any reference signal with a receive power greater than or equal to a threshold. Alternatively, when there is no reference signal with a receive power greater than or equal to the threshold, the time-frequency resource A is a time-frequency resource corresponding to any reference signal. Optionally, a low latency can be obtained by indicating the reference signal on the time-frequency resource A. The at least one codeword includes a codeword B. The codeword B is a codeword corresponding to the to-be-reported reference signal. A time-frequency resource on which the codeword B is sent may be a time-frequency resource A, or may be a time-frequency resource A1 associated with a time-frequency resource A. A low latency of indicating a reference signal can be obtained by determining the time-frequency resource A. Indication of a to-be-reported reference signal can be facilitated by sending the codeword B. For example, the to-be-reported reference signal is a reference signal with a largest receive power. In this way, by sending the at least one codeword on the at least one time-frequency resource, the to-be-reported reference signal can be indicated on a basis of obtaining a low latency. The network device determines, based on the received codeword B, the reference signal selected by the terminal. The network device sends data to the terminal on a transmit beam corresponding to the reference signal selected by the terminal. For example, the network device sends an msg 2, an msg4, or the msg B in the two-step random access process to the terminal on the beam corresponding to the reference signal selected by the terminal. In this way, for data transmission performed in the random access process, a better beam gain can be obtained. If a transmit beam and a receive beam of the network device are consistent, the network device may further determine the receive beam based on the transmit beam corresponding to the reference signal selected by the terminal, and receive an msg 1 and an msg 3 on the receive beam, or receive the msg A in the two-step random access process. In this way, for data carried in the msg 3 or the msg A in the random access process, a better beam gain can be obtained.

In this application, the terminal determines the at least one time-frequency resource and the at least one codeword based on a correspondence. The correspondence may be specified in a protocol, or may be configured by the network device for the terminal. The correspondence herein is not limited to a correspondence between a time-frequency resource and a codeword, but may be a correspondence of another type in this application. When the correspondence is configured by the network device for the terminal device, in an embodiment, it may mean that the network device configures a parameter used to determine the correspondence. The terminal determines the specific correspondence based on the parameter, or determines the specific correspondence based on the parameter in combination with a preset correspondence rule (or a mapping rule or an association rule). Alternatively, the network device may determine the specific correspondence in a same manner based on the parameter configured by the network device for the terminal. The correspondence may also be referred to as an association relationship, a mapping relationship, or the like. The following uses the mapping relationship as an example to describe the solution.

In this embodiment of this application, the correspondence may have a plurality of forms. Any form can achieve an objective of notifying, on a low-latency time-frequency resource, the network device of a selected to-be-reported reference signal. The following describes several optional correspondences provided in this embodiment of this application.

(1) First Correspondence

The first correspondence may include two layers of correspondences. The first layer of correspondence describes a correspondence between a reference signal and a time-frequency resource and a codeword. For example, the reference signal is an SSB, the time-frequency resource is a PRACH time-frequency resource, and the codeword is a preamble (preamble). The first layer of correspondence describes a correspondence between the SSB and the PRACH time-frequency resource and the preamble. One SSB may correspond to one or more PRACH time-frequency resources, and the SSB may be associated with some or all preambles on the corresponding PRACH time-frequency resource.

The first correspondence further includes a second layer of correspondence. The second layer of correspondence describes a correspondence between a reference signal and a codeword. Refer to the example in the first layer of correspondence. For example, the first layer of correspondence describes the correspondence between the SSB and the PRACH time-frequency resource and the preamble. The codeword in the second layer of correspondence may be a preamble.

In the second layer of correspondence, a preamble set between which and the reference signal a correspondence is established is some or all codewords in a codeword set associated with the time-frequency resource. For example, in the first layer of correspondence, if a first SSB is associated with a first PRACH time-frequency resource and is associated with some preambles on the first PRACH time-frequency resource, in the second layer of correspondence, a correspondence may be established between the some preambles on the first RRACH time-frequency resource and the reference signal. According to the second layer of correspondence, the reference signal selected by the terminal may be indicated by using the preamble.

Based on the first correspondence, when indicating the reference signal, the terminal selects, by using the first layer of correspondence, a resource position for sending the preamble; and determines, by using the second layer of correspondence, a preamble used to indicate the selected reference signal. For example, any reference signal with a receive power greater than or equal to the threshold is selected. Alternatively, when there is no reference signal with a receive power greater than or equal to the threshold, any reference signal is selected, and a time-frequency resource corresponding to the reference signal is determined based on the first layer of correspondence and is denoted as a first time-frequency resource. The reference signal with the largest receive power is selected, and a preamble corresponding to the reference signal with the largest receive power is determined based on the second layer of correspondence. The terminal sends, on the first time-frequency resource, the preamble determined based on the second layer of correspondence.

(2) Second Correspondence

The second correspondence is similar to the first correspondence and includes two layers of correspondences. The first layer of correspondence is the same as the first layer of correspondence in the first correspondence. The second layer of correspondence describes a correspondence between a reference signal and a codeword. The codeword in the second layer of correspondence may be a codeword other than a preamble, for example, a DMRS. A correspondence between a reference signal and a DMRS may be a correspondence between a reference signal and a DMRS sequence and/or a DMRS port. The descriptions about the correspondence between a reference signal and a DMRS is applicable to the entire application. According to the second layer of correspondence, the DMRS may indicate the reference signal selected by the terminal.

Based on the second correspondence, the terminal may select, by using the first layer of correspondence, a resource position for sending a preamble, for example, select any reference signal with a receive power greater than or equal to the threshold; or when there is no reference signal with a receive power greater than or equal to the threshold, select any reference signal, which is denoted as a reference signal 1. A time-frequency resource corresponding to the reference signal 1 is determined based on the first layer of correspondence and is denoted as a first time-frequency resource. The terminal determines, based on the first layer of correspondence, a preamble corresponding to the reference signal. In this case, the terminal may send, on the first time-frequency resource, the preamble selected based on the first mapping relationship. In this case, the preamble sent on the first time-frequency resource may be used as a preamble with a normal function in random access. The terminal further sends, on a second time-frequency resource associated with the first time-frequency resource, a DMRS determined based on the second layer of correspondence. For example, the terminal selects a reference signal with a largest receive power, which is denoted as a reference signal 2. The terminal determines, based on the second layer of correspondence, a DMRS corresponding to the reference signal 2. In this case, a scenario in which the first time-frequency resource is associated with the second time-frequency resource may be described as follows. In the two-step random access process, the msg A sent by the terminal to the network device includes the preamble and the DMRS, and resources for sending the msg A include the PRACH resource and the PUSCH resource. The PRACH resource is the first time-frequency resource, and the PUSCH resource is the second time-frequency resource. The preamble is sent on the first time-frequency resource, and the DMRS is sent on the second time-frequency resource.

(3) Third Correspondence

The third correspondence may include two layers of correspondences. The first layer of correspondence is the same as the first layer of correspondence in the first correspondence. The second layer of correspondence describes a correspondence between a reference signal and a codeword. The codeword in the second layer of correspondence may be a preamble. For example, a codeword in the first layer of correspondence is the codeword associated with the first time-frequency resource; and a codeword in the second layer of correspondence is the codeword associated with the second time-frequency resource. In this case, the second time-frequency resource is associated with the first time-frequency resource. A scenario in which the first time-frequency resource is associated with the second time-frequency resource may be described as follows. The first time-frequency resource and the second time-frequency resource are resources of a same type. The terminal repeatedly performs transmission of codewords of a same type on the two time-frequency resources. For example, both the first time-frequency resource and the second time-frequency resource are PRACH resources. In a random access process, a quantity of preambles sent by the terminal in one msg 1 or msg A is twice a normal quantity, and a quantity of occupied PRACH time-frequency resources is also twice a normal quantity. In an existing NR system, one time of msg 1 transmission occupies one RO, and one preamble is sent on the RO. In this application, one time of msg 1 or msg A transmission occupies two ROs, and one preamble is sent on each RO. One RO is the first time-frequency resource, and the other RO is the second time-frequency resource.

Based on the third correspondence, the terminal may select, by using the first layer of correspondence, a resource position for sending a preamble, for example, select any reference signal with a receive power greater than or equal to the threshold; or when there is no reference signal with a receive power greater than or equal to the threshold, select any reference signal, which is denoted as a reference signal 1. A time-frequency resource corresponding to the reference signal 1 is determined based on the first layer of correspondence and is denoted as a first time-frequency resource. A preamble with a normal function in random access is sent on the first time-frequency resource. The terminal selects a reference signal with a largest receive power, which is denoted as a reference signal 2. The terminal determines, based on the second layer of correspondence, a preamble corresponding to the reference signal 2. The terminal sends, on the second time-frequency resource associated with the first time-frequency resource, the preamble used to indicate the reference signal 2.

(4) Fourth Correspondence

The fourth correspondence may include two layers of correspondences. The first layer of correspondence is the same as the first layer of correspondence in the first correspondence. The second layer of correspondence describes a correspondence between a reference signal and a codeword. The codeword in the second layer of correspondence may be a preamble. A difference from the first correspondence is that a codeword in the second layer of correspondence and a codeword in the first layer of correspondence belong to different codeword sets. The codeword in the first layer of correspondence belongs to a first codeword set, and the codeword in the second layer of correspondence belongs to a second codeword set. Any reference signal with a receive power greater than or equal to the threshold is selected; or when there is no reference signal with a receive power greater than or equal to the threshold, any reference signal is selected, which is denoted as a reference signal 1. A time-frequency resource corresponding to the reference signal 1 is selected based on the first layer of correspondence in the fourth correspondence and is denoted as a first time-frequency resource. According to the first layer of correspondence, a codeword corresponding to the reference signal 1 is a codeword in the first codeword set. A reference signal with a largest receive power is selected, which is denoted as a reference signal 2. A codeword corresponding to the reference signal 2 is selected in the second codeword set based on the second layer of correspondence. The codeword corresponding to the reference signal 1 and the codeword corresponding to the reference signal 2 are sent on the first time-frequency resource. That the reference signal selected by the terminal is the reference signal 2 is implicitly indicated by using the codeword corresponding to the reference signal 2. The network device receives the two codewords on the first time-frequency resource; and determines, based on the second layer of correspondence, the reference signal 2 corresponding to the codeword, to determine the reference signal selected by the terminal.

For example, the first codeword set is a first preamble set on one or more PRACH resources corresponding to the SSB. The codeword in the second layer of correspondence belongs to the second codeword set. The second codeword set is a second preamble set on the one or more PRACH resources corresponding to the SSB. The second preamble set may be considered as expanding a preamble capacity of the one or more PRACH resources on the basis of the first preamble set. For example, based on the first preamble set, the one or more preambles are added in a manner of adding a cyclic shift (cyclic shift) or a root sequence (root sequence).

The four correspondences may be used independently. The reference signal selected by the terminal is implicitly indicated by using the codeword in the second layer of correspondence. The codeword in the second layer of correspondence may be a preamble or a DMRS. When the codeword in the second layer of correspondence is a preamble, the codeword may be a preamble with a normal function in the random access process, may be a new preamble expanded based on an original preamble set, or may be a preamble whose transmission is performed on another PRACH resource (that is, the second time-frequency resource). In addition to the function of implicitly indicating the reference signal selected by the terminal, the codeword in the second layer of correspondence may further have a function of a normal codeword. For example, the preamble of the second layer of correspondence may also have a function of a random access preamble with a normal function, and the DMRS in the second layer of correspondence may also have a function of a normal DMRS.

In addition, the four correspondences may alternatively be used in combination. Any two or more of the four correspondences may alternatively be used in combination. For example, if a quantity of codewords in a second layer of correspondence in a correspondence is less than a quantity of reference signals, a codeword in a second layer of correspondence in another correspondence may be combined to jointly indicate the reference signals (or a reference signal set). There may be a plurality of manners for jointly indicating reference signals. For example, a codeword in a second layer of correspondence is used to indicate a part of a reference signal set, and a codeword in another second layer of correspondence is used to indicate another part of the reference signal set. For another example, reference signals are grouped, a codeword in a second layer of correspondence is used to indicate a group number of the reference signals, and a codeword in another second layer of correspondence is used to indicate a reference signal in one group. In this way, the terminal may send the codeword in the second layer of correspondence in the first correspondence and the codeword in the second layer of correspondence in the second correspondence to jointly indicate the reference signals. In the joint indication manner, when one codeword resource is insufficient, more reference signals can be jointly indicated by using another codeword resource.

A reference signal set indicated in the joint indication manner may be a plurality of reference signals received by the terminal from the network device, may be a plurality of reference signals actually sent by the network device, may be a subset of reference signals actually sent by the network device, may be all candidate reference signals of a cell, or may be a subset of all candidate reference signals of a cell. More reference signals can be indicated in the joint indication manner. Therefore, such a manner can help indicate all the candidate reference signals of the cell.

A scenario in which the first correspondence and the second correspondence are combined is used as an example. The second layer of correspondence in the first correspondence describes the correspondence between a reference signal and a preamble, and the second layer of correspondence in the second correspondence describes the correspondence between a reference signal and a DMRS. Optionally, a scenario in which two correspondences are combined means that the preamble in the first correspondence indicates a part of a reference signal set, for example, one preamble may correspond to one reference signal in this part of reference signals; and the DMRS in the second correspondence indicates another part of the reference signal set, for example, one DMRS may correspond to one reference signal in the another part of reference signals. In another optional manner, a scenario in which two correspondences are combined means that the preamble in the first correspondence indicates a group number in a reference signal set, for example, one preamble corresponds to one group number; and the DMRS in the second correspondence indicates a reference signal in one group, for example, one DMRS may correspond to one reference signal in one group. In this way, by combining two correspondences, the terminal may send the preamble and the DMRS to jointly implicitly indicate the selected reference signal.

The foregoing several correspondences each are described by using the first layer of correspondence and the second layer of correspondence, so that the descriptions are convenient and can be understood more easily. Actually, a correspondence may alternatively not be divided into two layers of correspondences, and may be understood as a correspondence in an overall sense.

Based on the descriptions of the foregoing several correspondences, how to determine the at least one time-frequency resource and the at least one codeword in S202 is described in detail below.

(1) In the foregoing first case, that the terminal sends one codeword on one time-frequency resource may be described as that the terminal sends the first codeword on the first time-frequency resource. In the first case, the terminal or the network device may determine the first time-frequency resource and the first codeword based on the first correspondence. The first codeword has a correspondence with a first reference signal with a largest receive power in N reference signals. The first time-frequency resource has a correspondence with a second reference signal with a receive power greater than or equal to a threshold in N1 reference signals. When there is no reference signal with a receive power greater than or equal to the threshold in the N1 reference signals, the second reference signal may be any one of the N1 reference signals. The N reference signals are all candidate reference signals of a cell, reference signals actually sent in a cell, a subset of all candidate reference signals of a cell, or a subset of reference signals actually sent in a cell. The N1 reference signals may be the reference signals actually sent in the cell or a plurality of reference signals received by the terminal.

Specifically, the terminal receives the plurality of reference signals in S201. The terminal may determine, based on values of receive powers of the plurality of received reference signals, the second reference signal with a receive power greater than or equal to the threshold or any second reference signal, and the first reference signal with the largest receive power. Certainly, the first reference signal may be the same as the second reference signal. The terminal determines, based on the first layer of correspondence in the first correspondence, the first time-frequency resource corresponding to the second reference signal; and determines, based on the second layer of correspondence in the first correspondence, the first codeword corresponding to the first reference signal. The first layer of correspondence in the first correspondence is used to describe correspondences between the N1 reference signals and P time-frequency resources and a correspondence between each of the N1 reference signals and one or more codewords. According to the first layer of correspondence, the first time-frequency resource corresponding to the second reference signal may be determined. In a possible implementation, the second reference signal may be associated with a plurality of time-frequency resources, and the first time-frequency resource is one of the plurality of time-frequency resources associated with the second reference signal. A codeword, on the first time-frequency resource, having a correspondence with the second reference signal may be determined based on the first layer of correspondence. The codeword, on the first time-frequency resource, having a correspondence with the second reference signal is a subset of all codewords associated with the first time-frequency resource. The terminal determines, based on the correspondences between the N1 reference signals and the P time-frequency resources, the first time-frequency resource corresponding to the second reference signal.

The second layer of correspondence in the first correspondence is used to describe correspondences between the N reference signals and M codewords. M may be greater than N. In this case, a plurality of codewords may correspond to one reference signal, N codewords in the M codewords are in a one-to-one correspondence with the N reference signals, or a plurality of codewords correspond to one reference signal and one codeword corresponds to one reference signal. Alternatively, M may be equal to N. In this case, one codeword corresponds to one reference signal. Alternatively, M may be less than N. In this case, one codeword corresponds to a plurality of reference signals; or each of some of the M codewords corresponds to a plurality of reference signals, and in remaining codewords, one codeword corresponds to one reference signal. The M codewords are a subset of codewords associated with the first time-frequency resource, or the M codewords may be codewords, on the first time-frequency resource, corresponding to the second reference signal based on the first layer of correspondence. In other words, the M codewords may be described as codewords associated with the first time-frequency resource and the second reference signal based on the first layer of correspondence. The terminal determines, based on the correspondences between the N reference signals and the M codewords, the first codeword corresponding to the first reference signal.

The terminal sends the first codeword on the first time-frequency resource. The network device detects the first codeword on the first time-frequency resource; and determines, based on the second layer of correspondence in the first correspondence, the first reference signal corresponding to the first codeword, to determine an optimal transmit beam for the network device to communicate with the terminal device.

(2) In the second case, the terminal sends a plurality of codewords, for example, two codewords, on one time-frequency resource. It may be described as that the terminal sends the first codeword and the second codeword on the first time-frequency resource. In the second case, the terminal or the network device may determine the first time-frequency resource, the first codeword, and the second codeword based on the fourth correspondence. The first codeword has a correspondence with the first reference signal with the largest receive power in the N reference signals. The first time-frequency resource has a correspondence with the second reference signal with the receive power greater than or equal to the threshold in the plurality of received reference signals. When receive powers of the plurality of received reference signals are all less than or equal to the threshold, the second reference signal may be any one of the plurality of received reference signals. The N reference signals are all candidate reference signals of a cell, reference signals actually sent in a cell, a subset of all candidate reference signals of a cell, or a subset of reference signals actually sent in a cell. The N1 reference signals may be the reference signals actually sent in the cell or a plurality of reference signals received by the terminal.

Specifically, the terminal receives the plurality of reference signals in S201. The terminal may determine, based on values of receive powers of the plurality of received reference signals, the second reference signal with a receive power greater than or equal to the threshold or any second reference signal, and the first reference signal with the largest receive power. Certainly, the first reference signal may be the same as the second reference signal. The terminal determines, based on the first layer of correspondence in the fourth correspondence, the first time-frequency resource and the second codeword that correspond to the second reference signal; and determines, based on the second layer of correspondence in the fourth correspondence, the first codeword corresponding to the first reference signal. The first layer of correspondence in the fourth correspondence is used to describe correspondences between the N1 reference signals and P time-frequency resources and a correspondence between each of the N1 reference signals and one or more codewords. According to the first layer of correspondence, the second reference signal corresponds to the first time-frequency resource. In a possible implementation, the second reference signal may be associated with a plurality of time-frequency resources, and the first time-frequency resource is one of the plurality of time-frequency resources associated with the second reference signal.

The second layer of correspondence in the first correspondence is used to describe correspondences between the N reference signals and M codewords. The M codewords are a subset of codewords associated with the first time-frequency resource. M may be greater than N. In this case, one codeword corresponds to a plurality of reference signals. Alternatively, M may be equal to N. In this case, one codeword corresponds to one reference signal. Alternatively, M may be less than N. In this case, a plurality of codewords correspond to one reference signal.

The terminal determines, based on the correspondences between the N1 reference signals and the P time-frequency resources, the first time-frequency resource corresponding to the second reference signal. The terminal determines, based on the first layer of mapping relationship, the second codeword corresponding to the second reference signal. The terminal determines, based on the correspondences between the N reference signals and the M codewords, the first codeword corresponding to the first reference signal. The first codeword and the second codeword are both codewords associated with the first time-frequency resource. The second codeword belongs to a first codeword set, and the first codeword belongs to a second codeword set. The first codeword set and the second codeword set are two subsets with an empty intersection set in codewords associated with the first time-frequency resource. The second codeword set may be considered as being obtained through expansion based on the first codeword set, for example, obtained through expansion by adding a cyclic shift or a root sequence. Because the second codeword set is expanded based on the first codeword set, the second codeword set may be expanded based on a quantity of reference signals. For example, if the quantity of reference signals is N, the second codeword set may be expanded on the first time-frequency resource. For example, the expanded second codeword set may include N codewords (that is, M=N), so that the N codewords are in a one-to-one correspondence with the N reference signals.

The terminal sends the first codeword and the second codeword on the first time-frequency resource. The network device detects the first codeword and the second codeword on the first time-frequency resource; and determines, based on the second layer of correspondence in the fourth correspondence, the first reference signal corresponding to the first codeword, to determine an optimal reference signal selected by the terminal as the first reference signal.

(3) In the third case, the terminal sends a plurality of codewords on a plurality of time-frequency resources. For example, the terminal sends the second codeword on the first time-frequency resource, and sends the first codeword on the second time-frequency resource associated with the first time-frequency resource.

The first codeword may be a codeword with a type different from that of the second codeword. For example, the first codeword is a preamble, and the second codeword is a DMRS. In this case, the second time-frequency resource is a PRACH resource, and the first time-frequency resource is a PUSCH resource. The terminal or the network device may determine the first time-frequency resource, the second time-frequency resource, the first codeword, and the second codeword based on the second correspondence. The first time-frequency resource has a correspondence with the second reference signal with the receive power greater than or equal to the threshold in the plurality of received reference signals. When receive powers of the plurality of received reference signals are all less than or equal to the threshold, the second reference signal may be any one of the plurality of received reference signals. The first codeword has a correspondence with the first reference signal with the largest receive power in the N reference signals. The N reference signals are a subset of the plurality of received reference signals. The N reference signals are all candidate reference signals of a cell, reference signals actually sent in a cell, a subset of all candidate reference signals of a cell, or a subset of reference signals actually sent in a cell. The N1 reference signals may be the reference signals actually sent in the cell or a plurality of reference signals received by the terminal.

Specifically, the terminal receives the plurality of reference signals in S201. The terminal may determine, based on values of receive powers of the plurality of received reference signals, the second reference signal with a receive power greater than or equal to the threshold or any second reference signal, and the first reference signal with the largest receive power. Certainly, the first reference signal may be the same as the second reference signal. The terminal determines, based on the first layer of correspondence in the second correspondence, the first time-frequency resource and the second codeword that correspond to the second reference signal; and determines, based on the second layer of correspondence in the second correspondence, the first codeword corresponding to the first reference signal. The first layer of correspondence in the second correspondence is used to describe correspondences between the N1 reference signals and P time-frequency resources and a correspondence between each of the N1 reference signals and one or more codewords. The terminal determines, based on the first layer of correspondence in the second correspondence, the first time-frequency resource and the second codeword that correspond to the second reference signal.

The second layer of correspondence in the second correspondence is used to describe correspondences between the N reference signals and M codewords. The M codewords are a subset of codewords associated with the second time-frequency resource. M may be greater than N. In this case, a plurality of codewords correspond to one reference signal, N codewords in the M codewords are in a one-to-one correspondence with the N reference signals, or a plurality of codewords correspond to one reference signal and one codeword corresponds to one reference signal. Alternatively, M may be equal to N. In this case, one codeword corresponds to one reference signal. Alternatively, M may be less than N. In this case, one codeword corresponds to a plurality of reference signals; or each of some of the M codewords corresponds to a plurality of reference signals, and in remaining codewords, one codeword corresponds to one reference signal.

The terminal determines, based on the correspondences between the N1 reference signals and the P time-frequency resources, the first time-frequency resource corresponding to the second reference signal. The terminal determines, based on the first layer of mapping relationship in the second correspondence, the second codeword corresponding to the second reference signal. The terminal determines, based on the correspondences between the N reference signals and the M codewords, the first codeword corresponding to the first reference signal. The terminal sends the second codeword on the first time-frequency resource, and sends the first codeword on the second time-frequency resource. The network device detects the first codeword on the second time-frequency resource; and determines, based on the second layer of correspondence in the second correspondence, the first reference signal corresponding to the first codeword, to determine an optimal reference signal selected by the terminal as the first reference signal.

Alternatively, the first codeword may be a codeword with a type the same as that of the second codeword. For example, the first codeword is a preamble, and the second codeword is also a preamble. In this case, the first time-frequency resource and the second time-frequency resource are both PRACH resources. The second time-frequency resource associated with the first time-frequency resource may be a random access time-frequency resource. The terminal repeatedly performs transmission of preambles on the first time-frequency resource and the second time-frequency resource. The network device pre-configures or pre-defines an association relationship between the first time-frequency resource and the second time-frequency resource (for example, the first time-frequency resource and the second time-frequency resource belong to a same group). The first time-frequency resource and the second time-frequency resource may be time-division multiplexed. In this case, the first time-frequency resource and the second time-frequency resource may be continuous or discontinuous in time domain. Alternatively, the first time-frequency resource and the second time-frequency resource are frequency-division multiplexed. In this case, the first time-frequency resource and the second time-frequency resource may be continuous or discontinuous in frequency domain. For distinguishing description, the first codeword is a first preamble, and the second codeword is a second preamble. The terminal or the network device may determine the first time-frequency resource, the second time-frequency resource, the first preamble, and the second preamble based on the third correspondence. The first time-frequency resource has a correspondence with the second reference signal with the receive power greater than or equal to the threshold in the N reference signals. When there is no reference signal with a receive power greater than or equal to the threshold in the N1 reference signals, the second reference signal may be any one of the N1 reference signals. The first codeword has a correspondence with the first reference signal with the largest receive power in the N reference signals. The N reference signals are all candidate reference signals of a cell, reference signals actually sent in a cell, a subset of all candidate reference signals of a cell, or a subset of reference signals actually sent in a cell. The N1 reference signals may be the reference signals actually sent in the cell or a plurality of reference signals received by the terminal.

Specifically, the terminal receives the plurality of reference signals in S201. The terminal may determine, based on values of receive powers of the plurality of received reference signals, the second reference signal with a receive power greater than or equal to the threshold or any second reference signal, and the first reference signal with the largest receive power. Certainly, the first reference signal may be the same as the second reference signal. The terminal determines, based on the first layer of correspondence in the third correspondence, the first time-frequency resource and the second codeword that correspond to the second reference signal; determines, based on the association relationship, configured or pre-defined by the network device, between the first time-frequency resource and the second time-frequency resource, the second time-frequency resource associated with the first time-frequency resource; and determines, based on the second layer of correspondence in the third correspondence, the first codeword corresponding to the first reference signal. The first layer of correspondence in the third correspondence is used to describe correspondences between the N1 reference signals and P time-frequency resources and a correspondence between each of the N1 reference signals and one or more codewords. The terminal determines, based on the first layer of correspondence in the third correspondence, the first time-frequency resource and the second codeword that correspond to the second reference signal.

The second layer of correspondence in the third correspondence is used to describe correspondences between the N reference signals and M codewords. The M codewords are a subset of codewords associated with the second time-frequency resource. M may be greater than N. In this case, a plurality of codewords correspond to one reference signal, N codewords in the M codewords are in a one-to-one correspondence with the N reference signals, or a plurality of codewords correspond to one reference signal and one codeword corresponds to one reference signal. Alternatively, M may be equal to N. In this case, one codeword corresponds to one reference signal. Alternatively, M may be less than N. In this case, one codeword corresponds to a plurality of reference signals; or each of some of the M codewords corresponds to a plurality of reference signals, and in remaining codewords, one codeword corresponds to one reference signal. Because codewords corresponding to the N reference signals are determined in codewords associated with the second time-frequency resource, a quantity of codewords associated with the second time-frequency resource may be defined based on a quantity of reference signals. For example, if the quantity of reference signals is N, N codewords (that is, M=N) may be defined on the second time-frequency resource, so that the N codewords are in a one-to-one correspondence with the N reference signals.

The terminal determines, based on the correspondences between the N1 reference signals and the P time-frequency resources, the first time-frequency resource corresponding to the second reference signal. The terminal determines, based on the first layer of mapping relationship in the second correspondence, the second codeword corresponding to the second reference signal. The terminal determines, based on the correspondences between the N reference signals and the M codewords, the first codeword corresponding to the first reference signal. The terminal sends the second codeword on the first time-frequency resource, and sends the first codeword on the second time-frequency resource associated with the first time-frequency resource. The network device detects the first codeword on the second time-frequency resource; and determines, based on the second layer of correspondence in the third correspondence, the first reference signal corresponding to the first codeword, to determine an optimal reference signal selected by the terminal as the first reference signal.

In the foregoing cases, the described N reference signals in the second layer of correspondence are a reference signal set. The N reference signals may be pre-defined, or may be configured by the network device. For example, the network device configures N directional representative reference signals. In actual application, a plurality of beams may be similar or adjacent in direction, and a direction of one of the plurality of beams may be selected as a representative direction. The network device may combine reference signals corresponding to beams in a representative direction into N reference signals. Alternatively, the network device may divide all candidate SSBs in a cell into a plurality of SSB groups, and the N reference signals are one of the plurality of SSB groups.

Figure 3:
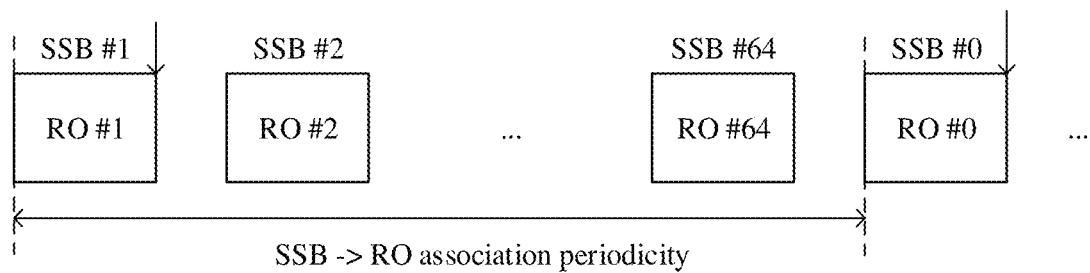
FIG. 3 is a schematic diagram of a latency required to indicate a reference signal in a conventional technology.

To better understand beneficial effects brought by the embodiments of this application, the beneficial effects of the embodiments of this application are described below by comparing an implementation of a conventional technology with the method in the embodiments of this application. In the conventional technology, the terminal determines an association relationship between an SSB and a PRACH time-frequency resource and a random access preamble based on configuration information of the network device. The terminal measures RSRPs of a plurality of SSBs, and selects any SSB with an RSRP greater than a preset threshold; or selects any SSB when there is no SSB with an RSRP greater than the preset threshold, and sends, on a PRACH time-frequency resource associated with the SSB, one of a plurality of preambles associated with the SSB. Optionally, the selected SSB with the RSRP greater than or equal to the threshold may be an SSB whose transmission occasion is early and that is obtained based on the first layer of correspondence. The network device determines, based on a detected preamble sequence and a PRACH time-frequency resource on which the preamble sequence is located, the SSB selected by the terminal. The network device sends a downlink Msg 2 and Msg 4 on a beam corresponding to the SSB selected by the terminal. As can be learned, the terminal completes only rough selection on a reference signal in the random access process, and performs finer selection on a reference signal based on another parameter after entering a connected mode. In this way, for data transmission completed in the random access process, it cannot be ensured that the data transmission can obtain a good beam direction gain. However, in the method provided in the embodiments of this application, selection and reporting of a reference signal that needs to be reported can be completed in the random access process. For example, the reference signal that needs to be reported is a reference signal with a largest receive power (which is also referred to as an optimal reference signal). For data transmission completed in the random access process (for example, transmission of data performed on a message 3 or a message B), a better beam direction gain can be obtained. In addition, the terminal can complete selection and reporting of the reference signal with the largest receive power in the random access process. Compared with the fine selection performed on the reference signal after the terminal enters the connected mode, selection and reporting can be completed more quickly. A method in the conventional technology is used. For example, as shown in FIG. 3, 64 beams correspond to 64 SSBs, one PRACH time-frequency resource is represented by using an RO, and one SSB is associated with one RO. In this case, 64 SSBs are associated with 64 ROs, and a mapping periodicity of the SSBs and the ROs is 160 ms. It is assumed that the terminal initiates random access on an RO #1. A measured SSB with a largest RSRP is an SSB #64. If the terminal chooses to report the SSB #64, the terminal can send, on an RO #64 associated with the SSB #64, a preamble associated with the SSB #64 after a latency of an entire association periodicity of 160 ms. However, if the method provided in the embodiments of this application is used, an RO, for example, an RO #1, associated with any SSB with a receive power greater than or equal to a threshold may be selected. A preamble indicating the SSB #64 is reported on the RO #1, and a sending occasion of the RO #64 does not need to be waited for. In this way, a low latency can be obtained. Certainly, in this embodiment of this application, a codeword indicating the SSB #64 may alternatively be reported on an RO or a PO associated with the RO #1, and a low latency can also be obtained.

Based on the reference signal indication method described above, the following uses an example in which a reference signal is indicated in a two-step random access process, an example in which a codeword is a preamble (preamble) and/or a DMRS, and an example in which a reference signal is an SSB. Based on this application scenario, the reference signal indication method provided in the embodiments of this application is further described in detail with reference to several examples. The method in the following examples may be applied to another scenario provided in the embodiments of this application, for example, applied to a scenario of another reference signal, another codeword, four-step random access, or inactive (inactive) data transmission. The another reference signal is, for example, a CSI-RS.

The foregoing first case is described first. The time-frequency resource is a PRACH time-frequency resource, and the codeword is a preamble.

The first layer of correspondence is a correspondence between an SSB and a PRACH time-frequency resource and a preamble. The second layer of correspondence is a correspondence between an SSB set and a preamble set. The preamble set in the second layer of correspondence may be a preamble set, associated with an SSB, in the first layer of correspondence. The terminal determines an SSB 1 with an RSRP greater than a preset threshold. When there is no SSB with an RSRP greater than the preset threshold, the SSB 1 may be any SSB. The terminal selects, based on the first layer of correspondence, one or more PRACH time-frequency resources associated with the SSB 1 and a preamble set on the one or more PRACH time-frequency resources. In the second layer of correspondence, the preamble set between which and the SSB set the correspondence is established may be the preamble set on the one or more PRACH time-frequency resources, or may be a subset of the preamble set on the one or more PRACH time-frequency resources. The terminal determines an SSB 2 with a largest RSRP, and selects, from the preamble set based on the second layer of correspondence, a preamble 1 associated with the SSB 2. The terminal sends the preamble 1 to the network device in an msg A, to implicitly indicate that the SSB with the largest RSRP in the SSB set is the SSB 2. After detecting the preamble 1, the network device determines, based on the second layer of correspondence, the SSB 2 associated with the preamble 1; and sends an msg B on a beam of the SSB 2. If the network device has transmit/receive beam consistency, the network device may alternatively determine, based on a determined transmit beam, a beam for receiving a PUSCH in an msg A. The PUSCH in the msg A includes uplink data carried in the PUSCH in the msg A.

The SSB set in the second layer of correspondence may be all candidate SSBs in a current cell, may be all SSBs whose transmission is actually performed in a current cell, may be a subset of all candidate SSBs in a current cell, or may be a subset of all SSBs whose transmission is actually performed in a current cell. The SSB set may be pre-defined, or may be configured by the network device. For example, the SSB set may be an SSB set that is configured by the network device and that has a representative beam direction, or may be one of a plurality of SSB groups.

In the second layer of correspondence, preambles and SSBs may be in a one-to-one correspondence, that is, one preamble corresponds to one SSB; may be in a one-to-many correspondence, that is, one preamble corresponds to a plurality of SSBs; or may be in a many-to-one correspondence, that is, a plurality of preambles correspond to one SSB. In the second layer of correspondence, the correspondences between preambles and SSBs are configured by the network device for the terminal by using signaling. If the correspondences have not been configured, it is considered by default that the preambles may be in a one-to-one correspondence with the SSBs. The correspondences may further be determined based on a quantity of preambles in a preamble set associated with each SSB and a quantity of SSBs in an SSB set.

In the second layer of correspondence, when one preamble corresponds to a plurality of SSBs, the network device cannot uniquely determine the SSB with the largest RSRP in the SSB set based on a detected preamble, and can only determine that the SSB with the largest RSRP is in a plurality of SSBs associated with the detected preamble. For this case, the network device may divide SSBs in the SSB set in advance to classify SSBs with similar beam directions into one group, and notify the terminal of SSB grouping information. Therefore, the second layer of correspondence may be described as that one preamble corresponds to one group of SSBs. The terminal may correspond one preamble to one group of SSBs based on the second layer of correspondence. The terminal determines a preamble corresponding to a group in which the SSB with the largest RSRP is located; and sends, to the network device, the preamble corresponding to the group in which the SSB with the largest RSRP is located. In this way, the network device can determine a group of SSBs with similar beam directions by using a detected preamble and send the msg B on any beam in the group of beams.

The following further describes the foregoing first case by using several specific examples.

Figure 4:
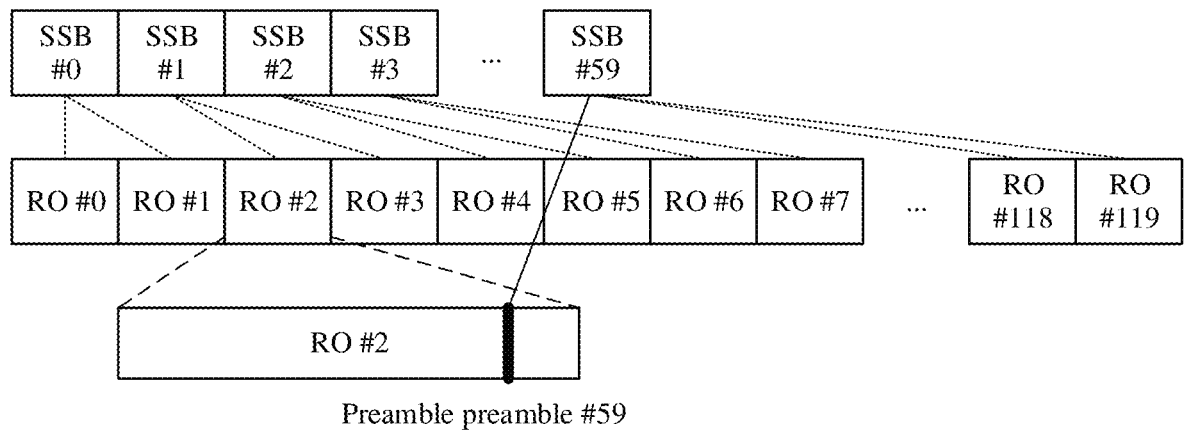
FIG. 4 is a schematic diagram of a first indication example of a reference signal according to an embodiment of this application.

As shown in FIG. 4, a total quantity of candidate SSBs in a cell is 64, and a quantity of SSBs actually sent in the cell is 60. The first layer of correspondence is that one SSB is associated with two ROs, and each RO is associated with 64 preambles, that is, one SSB is associated with 128 preambles. In the second layer of correspondence, the SSB set is all the candidate SSBs in the cell, to be specific, 64 SSBs.

The second layer of correspondence is that 64 preambles on each RO may be sequentially in a one-to-one correspondence with the 64 candidate SSBs. The terminal may randomly select an SSB with an RSRP greater than or equal to the threshold, for example, an SSB #1. According to the first layer of correspondence, the SSB #1 is associated with an RO #2 and an RO #3, and is associated with 128 preambles on the RO #2 and the RO #3. The terminal selects, based on the first layer of correspondence, any one of the RO #2 and the RO #3 that are associated with the SSB #1, for example, the RO #2. According to the second layer of correspondence, 64 preambles associated with the RO #2 are in a one-to-one correspondence with 64 candidate SSBs. The terminal selects, on the RO #2, a preamble corresponding to an SSB with a largest RSRP. For example, the SSB with the largest RSRP is an SSB #59. According to the second layer of correspondence, the SSB #59 corresponds to a preamble #59 on the RO #2. In this case, the terminal selects the preamble #59 on the RO #2. The terminal sends the preamble #59 on the RO #2. After detecting the preamble #59, the network device determines, based on the second layer of correspondence, the SSB #59 corresponding to the preamble #59, and determines that an optimal reference signal selected by the terminal is the SSB #59. The network device sends the msg B on a beam corresponding to the SSB #59. In addition, if the network device has transmit/receive beam consistency, the network device may alternatively receive the PUSCH in the msg A on a receive beam corresponding to the SSB #59.

Still refer to FIG. 4. The total quantity of candidate SSBs in the cell is 64, and the quantity of SSBs actually sent in the cell is 60. The first layer of correspondence is that one SSB is associated with two ROs, and each RO is associated with 64 preambles, that is, one SSB is associated with 128 preambles. In the second layer of correspondence, the SSB set is the SSBs actually sent in the cell, that is, 60 SSBs. The second layer of correspondence is that 60 specified preambles on each RO are in a one-to-one correspondence with 60 actually sent SSBs. For example, first 60 preambles on each RO may be sequentially in a one-to-one correspondence with the 60 actually sent SSBs. The terminal may randomly select an SSB with an RSRP greater than or equal to the threshold, for example, an SSB #1. According to the first layer of correspondence, the SSB #1 is associated with an RO #2 and an RO #3, and is associated with 128 preambles on the RO #2 and the RO #3. The terminal selects, based on the first layer of correspondence, any one of the RO #2 and the RO #3 that are associated with the SSB #1, for example, the RO #2. According to the second layer of correspondence, first 60 preambles associated with the RO #2 are in a one-to-one correspondence with 60 SSBs. The terminal selects, on the RO #2, a preamble corresponding to an SSB with a largest RSRP. For example, the SSB with the largest RSRP is an SSB #59. According to the second layer of correspondence, the SSB #59 corresponds to a preamble #59 on the RO #2. In this case, the terminal selects the preamble #59 on the RO #2. The terminal sends the preamble #59 on the RO #2. After detecting the preamble #59, the network device determines, based on the second layer of correspondence, the SSB #59 corresponding to the preamble #59, and determines that an optimal reference signal selected by the terminal is the SSB #59. The network device sends the msg B on a beam corresponding to the SSB #59. In addition, if the network device has transmit/receive beam consistency, the network device may alternatively receive the PUSCH in the msg A on a receive beam corresponding to the SSB #59.

Figure 5:
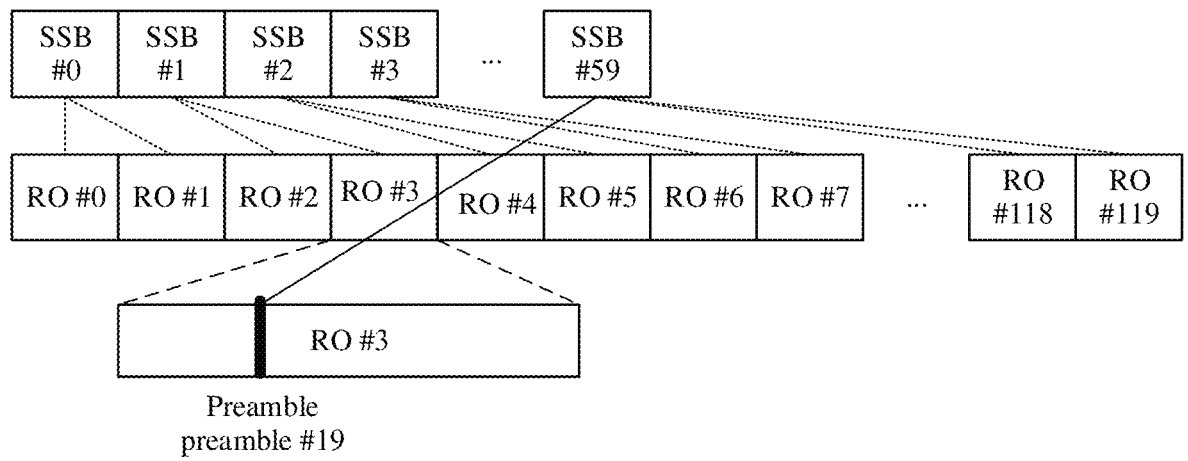
FIG. 5 is a schematic diagram of a second indication example of a reference signal according to an embodiment of this application.

As shown in FIG. 5, a total quantity of candidate SSBs in a cell is 64, and a quantity of SSBs actually sent in the cell is 60. The first layer of mapping is that one SSB is associated with two ROs, and each SSB is associated with 40 preambles on an RO, that is, two ROs associated with one SSB have a total of 80 preambles. In the second layer of correspondence, the SSB set is the SSBs actually sent in the cell, that is, 60 SSBs. The second layer of correspondence is that first 60 preambles in 80 preambles associated with each SSB are in a one-to-one correspondence with 60 SSBs in an SSB set. For example, the 60 preambles may be sequentially in a one-to-one correspondence with the 60 SSBs. The terminal may randomly select an SSB with an RSRP greater than or equal to the threshold, for example, an SSB #1. According to the first layer of correspondence, the SSB #1 is associated with an RO #2 and an RO #3, and is associated with 80 preambles on the RO #2 and the RO #3. According to the second layer of correspondence, first 60 preambles in the 80 preambles on the RO #2 and the RO #3 are in a one-to-one correspondence with the 60 SSBs. The terminal determines the SSB with the largest RSRP, for example, the SSB #59. In this case, the terminal selects, from the 80 preambles on the RO #2 and the RO #3, a preamble #59 corresponding to the SSB #59. There are a total of 40 preambles on the RO #2. In this case, the preamble #59 corresponds to a preamble #19 on the RO #3. The terminal sends the preamble #19 on the RO #3. The network device detects the preamble #19 on the RO #3, determines that the preamble #19 on the RO #3 is the preamble #59 on the RO #2 and the RO #3, determines, based on the second layer of correspondence, the SSB #59 corresponding to the preamble #59, and determines that an optimal reference signal selected by the terminal is the SSB #59. The network device sends the msg B on a beam corresponding to the SSB #59. In addition, if the network device has transmit/receive beam consistency, the network device may alternatively receive the PUSCH in the msg A on a receive beam corresponding to the SSB #59.

Figure 6:
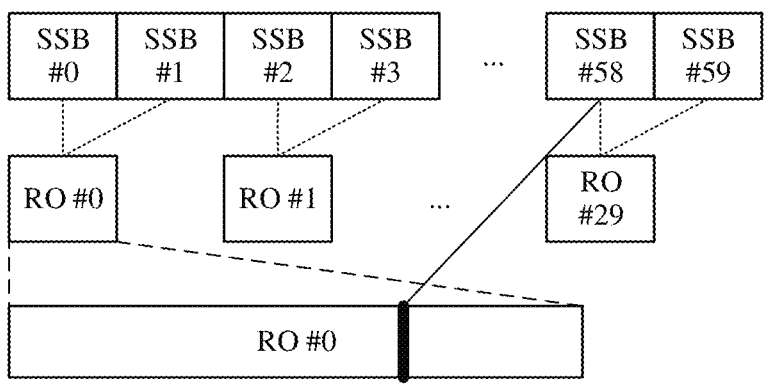
FIG. 6 is a schematic diagram of a third indication example of a reference signal according to an embodiment of this application.

As shown in FIG. 6, a total quantity of candidate SSBs in a cell is 64, and a quantity of actually sent SSBs is 60. The first layer of correspondence is that two SSBs are associated with one RO, and each SSB is associated with 30 preambles. In the second layer of correspondence, the SSB set is a subset of the SSBs actually sent in the cell. For example, the subset is SSBs with even numbers in the 60 actually sent SSBs. Certainly, the subset may alternatively be SSBs with odd numbers in the 60 actually sent SSBs or any 30 SSBs. The second layer of correspondence is that 30 preambles associated with each SSB are in a one-to-one correspondence with 30 SSBs in the SSB set. For example, the 30 preambles may be in a one-to-one correspondence with the 30 SSBs in an order of numbers. For example, the SSB set is SSBs with even numbers in the 60 actually sent SSBs. In 30 preambles associated with each SSB, a preamble #0 corresponds to an SSB #0, a preamble #1 corresponds to an SSB #2, a preamble #2 corresponds to an SSB #4, a preamble #3 corresponds to an SSB #6, a preamble #4 corresponds to an SSB #8, . . . , a preamble #28 corresponds to an SSB #56, and a preamble #29 corresponds to an SSB #58.

SSBs received by the terminal may be the 60 SSBs actually sent in the cell, or may be some of the 60 SSBs actually sent in the cell. The terminal randomly selects an SSB with an RSRP greater than or equal to the threshold from the received SSBs, for example, an SSB #1. According to the first layer of correspondence, an RO #0 corresponding to the SSB #1 is determined, and 30 preambles associated with the SSB #1 on the RO #0 are determined. The terminal selects an SSB with a largest RSRP from the received SSBs, for example, the SSB #58. The terminal selects, from the 30 preambles associated with the SSB #1 on the RO #0 determined based on the first layer of correspondence, the preamble #29 corresponding to the SSB #58 based on the second layer of correspondence. The terminal sends the preamble #29 on the RO #0. After detecting the preamble #29 on the RO #0, the network device determines, based on the second layer of correspondence, the SSB #58 corresponding to the preamble #29, and determines that an optimal reference signal selected by the terminal is the SSB #58. The network device sends the msg B on a beam corresponding to the SSB #58. In addition, if the network device has transmit/receive beam consistency, the network device may alternatively receive the PUSCH in the msg A on a receive beam corresponding to the SSB #58.

In the example in the first case, on the basis that configurations of an existing PRACH time-frequency resource and a preamble set on each PRACH time-frequency resource are not changed, the terminal selects an RO and a preamble based on the SSB with the RSRP greater than or equal to the threshold and the SSB with the largest RSRP in the SSB set, to implicitly report the SSB with the largest RSRP in the SSB set to the network device.

The following describes the foregoing second case. The time-frequency resource is a PRACH time-frequency resource, and the codeword is a preamble. The terminal sends two preambles on one RO.

In the second case, on the basis that each existing RO is associated with 64 preambles, a quantity of preambles associated with each RO is increased by adding a cyclic shift (cyclic shift) or a root sequence (root sequence). Added preambles correspond to an SSB set, so that an SSB is implicitly indicated. The terminal sends two preambles on one RO in one PRACH transmission process. One of the preambles is one of 64 original preambles, and has a function of a normal preamble; and the other preamble is one of the newly added preambles, and is used to indicate an SSB selected by the terminal. A correspondence between each RO or 64 original preambles on each RO and an SSB may be the same as that in a conventional technology, and may be considered as the first layer of correspondence. The second layer of correspondence may be understood as a correspondence between a newly added preamble and an SSB. A quantity of newly added preambles may be equal to a quantity of SSBs actually sent in the cell, or may be equal to a quantity of all candidate SSBs in the cell.

The terminal determines, in the received SSBs, any SSB with an RSRP greater than or equal to the threshold and the SSB with the largest RSRP. The SSB with the RSRP greater than or equal to the threshold may be exactly the SSB with the largest RSRP. The terminal determines, based on the first layer of correspondence, an RO associated with the SSB with the RSRP greater than or equal to the threshold, and determines one of first 64 preambles on the RO. The terminal determines, based on the second layer of correspondence and in newly added preambles other than the first 64 preambles on the RO, a preamble associated with the SSB with the largest RSRP in the SSB set. The terminal sends an msg A to the network device, where the msg A includes two preambles, and one of the preambles implicitly indicates the SSB with the largest RSRP in the SSB set. After detecting the preamble, the network device determines, based on the second layer of correspondence, the SSB with the largest RSRP that corresponds to the preamble and that is selected by the terminal, and sends the msg B on a transmit beam of the SSB associated with the preamble. If the network device has transmit/receive beam consistency, the network device may alternatively determine, based on a determined transmit beam, a beam for receiving a PUSCH in an msg A.

The SSB set in the second layer of correspondence may be all candidate SSBs in a current cell, may be all SSBs whose transmission is actually performed in a current cell, may be a subset of all candidate SSBs in a current cell, or may be a subset of all SSBs whose transmission is actually performed in a current cell. In actual application, a quantity of newly added preambles may be determined based on a quantity of SSBs actually sent in the cell or a quantity of all candidate SSBs in the cell. For example, the quantity of newly added preambles may be equal to the quantity of SSBs actually sent in the cell or the quantity of all candidate SSBs in the cell. Therefore, preferably, the SSB set in the second layer of correspondence is all the SSBs whose transmission is actually performed in the cell or all the candidate SSBs in the current cell.

For a corresponding manner between the SSB set and the preamble set in the second layer of correspondence, refer to the manner described in the foregoing first case. In the second layer of correspondence, SSBs and preambles may be in a one-to-one correspondence, that is, one preamble corresponds to one SSB; may be in a one-to-many correspondence, that is, one preamble corresponds to a plurality of SSBs; or may be in a many-to-one correspondence, that is, a plurality of preambles correspond to one SSB. In the second layer of correspondence, the correspondences between preambles and SSBs are configured by the network device for the terminal by using signaling. If the correspondences have not been configured, it is considered by default that the preambles may be in a one-to-one correspondence with the SSBs. The correspondences may further be determined based on a quantity of preambles in a preamble set associated with each SSB and a quantity of SSBs in an SSB set. The quantity of newly added preambles may be equal to the quantity of SSBs actually sent in the cell, or may be equal to the quantity of all candidate SSBs in the cell. Therefore, preferably, in the second layer of correspondence, the SSBs may be in a one-to-one correspondence with the preambles.

The following further describes the foregoing second case by using several specific examples.

Figure 7:
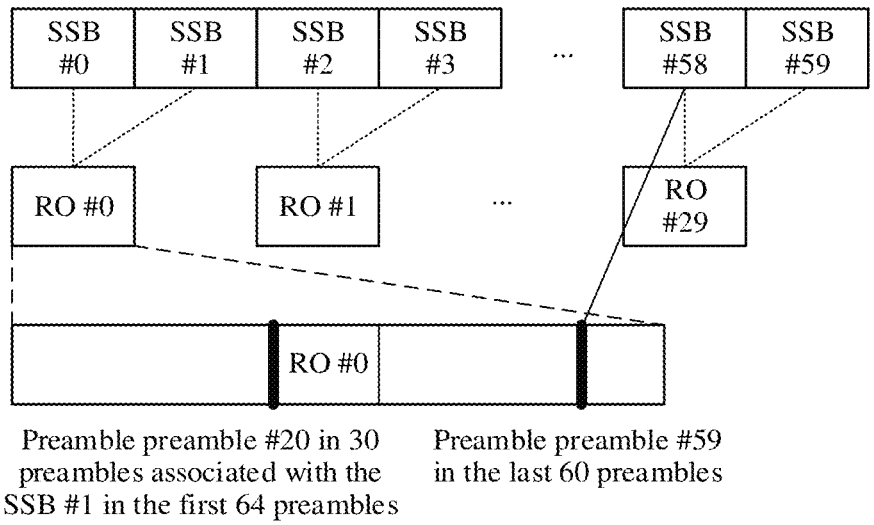
FIG. 7 is a schematic diagram of a fourth indication example of a reference signal according to an embodiment of this application.

As shown in FIG. 7, a total quantity of candidate SSBs in a cell is 64, and a quantity of SSBs actually sent in the cell is 60. The first layer of correspondence is that two SSBs are associated with one RO, there are initially 64 preambles on one RO, and each SSB is associated with 30 preambles. By adding a cyclic shift and/or a root sequence, 60 preambles are added to 64 initial preambles, that is, there are a total of 124 preambles on each RO. In the second layer of correspondence, the SSB set is 60 SSBs actually sent in the cell. The second layer of correspondence may be described as that the last 60 preambles (that is, the 60 newly added preambles obtained through expansion) on each RO are in a one-to-one correspondence with the 60 SSBs actually sent in the cell. For example, the last 60 preambles may be in a one-to-one correspondence with the 60 SSBs in an order of numbers.

SSBs received by the terminal may be the 60 SSBs actually sent in the cell, or may be some of the 60 SSBs actually sent in the cell. The terminal randomly selects an SSB with an RSRP greater than or equal to the threshold from the received SSBs, for example, an SSB #1. According to the first layer of correspondence, an RO #0 corresponding to the SSB #1 is determined, and any preamble is selected from 30 preambles associated with the SSB #1 on the RO #0, for example, a preamble #20 in the 30 preambles associated with the SSB #1 on the RO #0. The terminal selects an SSB with a largest RSRP from the received SSBs, for example, the SSB #58. The terminal selects, from the last 60 preambles on the RO #0, a preamble #58 corresponding to the SSB #58. The terminal sends an msg A to the network device. The msg A includes a preamble #20 in the 30 preambles associated with the SSB #1 on the RO #0 and the preamble #58 associated with the SSB #58 in the last 60 preambles on the RO #0. After detecting the preamble #58 in the last 60 preambles on the RO #0, the network device determines, based on the second layer of correspondence, the SSB #58 corresponding to the preamble #58, and determines that an optimal SSB selected by the terminal is the SSB #58. In this case, the network device sends the msg B on a beam corresponding to the SSB #58. If the network device has transmit/receive beam consistency, the network device may alternatively receive the PUSCH in the msg A on a receive beam corresponding to the SSB #58.

In the example of the foregoing second case, each time the terminal sends the msg A, the terminal sends two preambles on an RO. One of the preambles is selected by the terminal based on the SSB with the largest RSRP in the SSB set, to implicitly report the SSB with the largest RSRP in the SSB set to the network device.

The following describes the foregoing third case by using examples. The third case includes sending two codewords on two time-frequency resources. The two time-frequency resources may be two PRACH time-frequency resources, or the time-frequency resources include one PRACH time-frequency resource and one PUSCH resource.

First, when the two time-frequency resources may be two PRACH time-frequency resources, the two codewords are two preambles.

The two PRACH time-frequency resources are associated with each other. Specifically, in the embodiments of this application, a quantity of repetitions of PRACHs may be changed into 2 k times, where k is an original quantity of repetitions of PRACHs. An NR system is used as an example. In an existing NR system, k=1, to be specific, one RO is occupied each time the terminal performs transmission of a PRACH. The quantity of repetitions of PRACHs in the NR system is changed into twice, to be specific, two ROs are occupied each time the terminal performs transmission of a PRACH. The terminal indicates an SSB with a largest RSRP in a plurality of SSBs by using preambles on one of two ROs.

Two ROs are occupied each time the terminal performs transmission of a PRACH. Two ROs may be considered as one RO group. The first layer of correspondence is a correspondence between an SSB and one RO and a preamble on the RO. The second layer of correspondence is a correspondence between a preamble on the other RO and an SSB. Two ROs in each RO group may be time-division multiplexed or frequency-division multiplexed, and may continuous or discontinuous in time domain or frequency domain. The RO in the first layer of correspondence may be a previous RO, or may be a next RO.

The terminal determines an SSB 1 with an RSRP greater than a preset threshold, or determines any SSB 1 when there is no SSB with an RSRP greater than a preset threshold and determines an SSB 2 with a largest RSRP. The terminal selects, based on the first layer of correspondence, an RO 1 associated with the SSB 1 and a preamble 1 on the RO; determines an RO 2 in a same group as the RO 1; and selects, based on the second layer of correspondence and from preambles on the RO 2, a preamble 2 associated with the SSB 2 in the SSB set. The SSB 1 may be the same as the SSB 2. The terminal sends an msg A to the network device, where the msg A includes two preambles, and the two preambles are respectively on two ROs in an RO group. A preamble on one of the ROs implicitly indicates the SSB with the largest RSRP in the SSB set. After detecting the preamble 2, the network device sends an msg B on a beam for sending the SSB 2 associated with the preamble 2. If the network device has transmit/receive beam consistency, the network device may alternatively determine, based on a determined transmit beam, a beam for receiving a PUSCH in an msg A.

The SSB set in the second layer of correspondence may be all candidate SSBs in a current cell, may be all SSBs whose transmission is actually performed in a current cell, may be a subset of all candidate SSBs in a current cell, or may be a subset of all SSBs whose transmission is actually performed in a current cell. The SSB set may be pre-defined, or may be configured by the network device. For example, the SSB set may be an SSB set that is configured by the network device and that has a representative beam direction, or may be one of a plurality of SSB groups. Because all preambles on the RO in the second-layer correspondence may be used to implicitly indicate an SSB, a quantity of preambles on the RO may be defined based on a quantity of SSB sets in the second layer of correspondence. Optionally, SSB sets corresponding to all preambles on the RO in the second layer of correspondence may be all SSBs whose transmission is actually performed, or all candidate SSBs of a current cell.

In the second layer of correspondence, preambles and SSBs may be in a one-to-one correspondence, that is, one preamble corresponds to one SSB; may be in a one-to-many correspondence, that is, one preamble corresponds to a plurality of SSBs; or may be in a many-to-one correspondence, that is, a plurality of preambles correspond to one SSB. In the second layer of correspondence, the correspondences between preambles and SSBs are configured by the network device for the terminal by using signaling. If the correspondences have not been configured, it is considered by default that the preambles may be in a one-to-one correspondence with the SSBs. The correspondences may further be determined based on a quantity of preambles in a preamble set associated with each SSB and a quantity of SSBs in an SSB set. Because a quantity of preambles on the RO may be defined based on a quantity of SSB sets in the second layer of correspondence, optionally, a one-to-one correspondence between SSBs and preambles in the second layer of correspondence may be sequentially implemented more easily.

Figure 8:
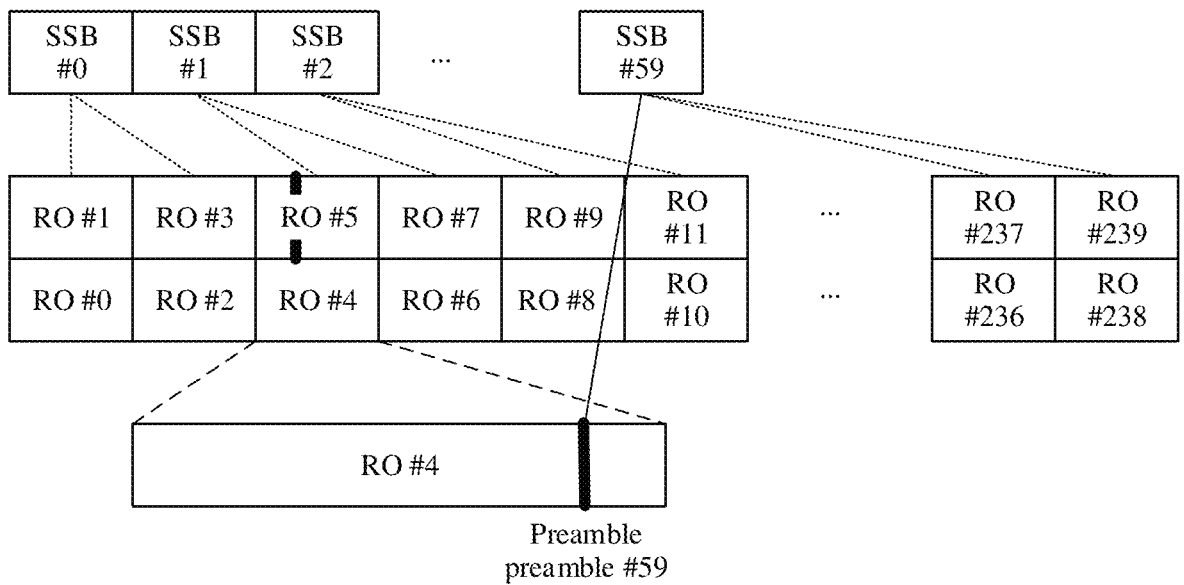
FIG. 8 is a schematic diagram of a fifth indication example of a reference signal according to an embodiment of this application.

As shown in FIG. 8, a total quantity of candidate SSBs in a cell is 64, and a quantity of SSBs actually sent in the cell is 60. The first layer of correspondence is that one SSB is associated with two ROs, and each RO is associated with 64 preambles, that is, there are a total of 128 preambles on two ROs associated with one SSB. Two ROs in each RO group are frequency-division multiplexed, and the RO used for the second layer of correspondence is the previous RO. In the second layer of correspondence, the SSB set is 60 SSBs actually sent in the cell. For each RO used for the second layer of correspondence, the second layer of correspondence may be described as that first 60 preambles in 64 preambles on the RO are in a one-to-one correspondence with the 60 SSBs actually sent in the cell.

SSBs received by the terminal may be the 60 SSBs actually sent in the cell, or may be some of the 60 SSBs actually sent in the cell. The terminal randomly selects an SSB with an RSRP greater than or equal to the threshold from the received SSBs, for example, an SSB #1. The SSB #1 is associated with an RO #5 and an RO #7 in the first layer of correspondence. Any one of the two ROs is selected to send a preamble. For example, the RO #5 is selected. Any one of 64 preambles on the RO #5 is selected, for example, a preamble #10. An RO that is associated with the RO #5 and that is used for the second layer of correspondence is an RO #4. The terminal selects an SSB with a largest RSRP from the received SSBs. For example, the SSB with the largest RSRP is an SSB #59. The terminal selects, on the RO #4, a preamble #59 corresponding to the SSB #59.

The terminal sends an msg A to the network device. The msg A includes the preamble #59 on the RO #4 and the preamble #10 on the RO #5. The preamble #10 on the RO #5 is used for a function on of a normal random access preamble, and the preamble #59 on the RO #4 is used to indicate the SSB with the largest RSRP. After detecting the preamble #59 on the RO #4, the network device determines, based on the second layer of correspondence, the SSB #59 corresponding to the preamble #59, and determines that an optimal SSB selected by the terminal is the SSB #59. In this case, the network device sends the msg B on a beam corresponding to the SSB #59. If the network device has transmit/receive beam consistency, the network device may alternatively receive the PUSCH in the msg A on a receive beam corresponding to the SSB #59.

Figure 9:
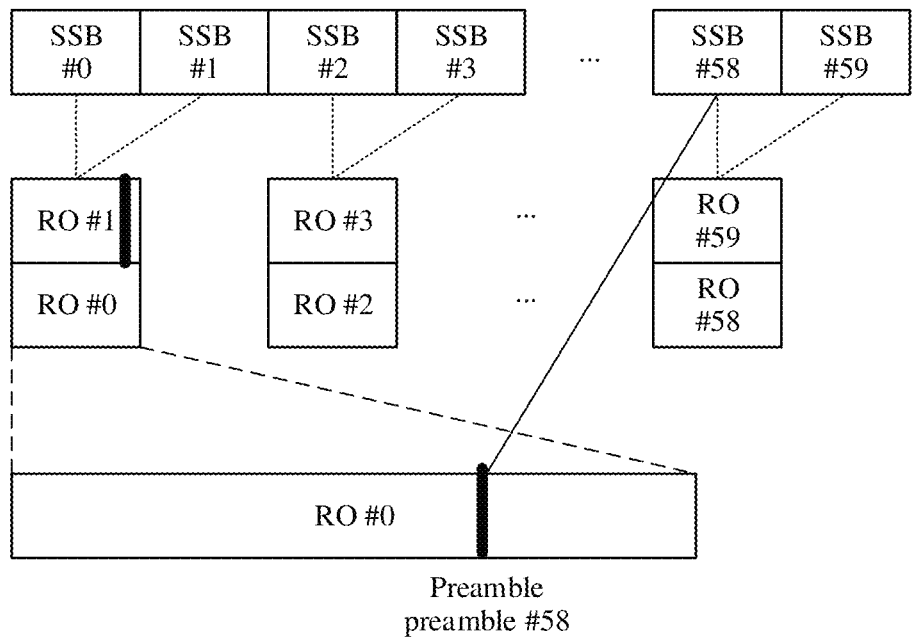
FIG. 9 is a schematic diagram of a sixth indication example of a reference signal according to an embodiment of this application.

As shown in FIG. 9, a total quantity of candidate SSBs in a cell is 64, and a quantity of SSBs actually sent in the cell is 60. The first layer of correspondence is that two SSBs are associated with one RO, and each SSB is associated with 30 preambles. Two ROs in each RO group are frequency-division multiplexed, and the RO used for the second layer of correspondence is the previous RO. In the second layer of correspondence, the SSB set is 60 SSBs actually sent in the cell. The second layer of correspondence is that first 60 preambles in 64 preambles on an RO are in a one-to-one correspondence with the 60 SSBs actually sent in the cell. The first 60 preambles may be in a one-to-one correspondence with the 60 SSBs in an order of numbers. The terminal may randomly select an SSB with an RSRP greater than or equal to the threshold, for example, an SSB #1. According to the first layer of correspondence, an SSB #1 corresponds to an RO #1, and the RO #1 and an RO #0 are located in a same RO group. According to the first layer of correspondence, on the RO #1 corresponding to the SSB #1, and any preamble is selected from 30 preambles associated with the SSB #1, for example, a preamble #29 in the 30 preambles associated with the SSB #1 on the RO #1. The terminal selects an SSB with a largest RSRP. For example, the SSB with the largest RSRP is an SSB #58; and selects, on the RO #0 in the second layer of correspondence, a preamble #58 corresponding to the SSB #58. The terminal sends an msg A to the network device. The msg A includes the preamble #58 on the RO #0 and the preamble #29 in the 30 preambles associated with the SSB #1 on the RO #1. After detecting the preamble #58 on the RO #0, the network device sends the msg B on a beam corresponding to the SSB #58. If the network device has transmit/receive beam consistency, the network device may alternatively receive the PUSCH in the msg A on a receive beam corresponding to the SSB #58.

In the example of one of the foregoing three cases, the msg A sent by the terminal each time includes two preambles respectively sent on two ROs. On one of the ROs, the terminal selects a preamble based on the SSB with the largest RSRP in the SSB set, to implicitly report the SSB with the largest RSRP in the SSB set.

Second, when the two time-frequency resources include one PRACH time-frequency resource and one PUSCH resource, the two codewords include a preamble and a DMRS.

The first layer of correspondence is a correspondence between an SSB and a PRACH time-frequency resource and a preamble. The second layer of correspondence is a correspondence between an SSB and a DMRS. The correspondence between an SSB and a DMRS includes: a correspondence between an SSB and a DMRS port and/or a DMRS sequence.

The terminal determines, based on the second layer of correspondence, a DMRS corresponding to an SSB with a largest RSRP in a plurality of SSBs; and may implicitly report the SSB with the largest RSRP in the plurality of SSBs by sending the DMRS to the network device. In this application, the described "implicit" reporting of a reference signal may also be understood as explicit reporting, and a codeword indicating the reference signal is used as explicit indication information.

The second layer of correspondence describes correspondences between a plurality of DMRS ports and/or a plurality of DMRS sequences and a plurality of SSBs in an SSB set. The plurality of DMRS ports and/or DMRS sequences may be all available DMRS ports and/or DMRS sequences configured by the network device, or may be a subset of all available DMRS ports and/or DMRS sequences configured by the network device, for example, a DMRS port and/or a DMRS sequence associated with a preamble determined by the terminal. The SSB set may be all candidate SSBs in a current cell, may be all SSBs whose transmission is actually performed in a current cell, may be a subset of all candidate SSBs in a current cell, or may be a subset of all SSBs whose transmission is actually performed in a current cell. The SSB set may be pre-defined, or may be configured by the network device. For example, the SSB set may be an SSB set that is configured by the network device and that has a representative beam direction, or may be one of a plurality of SSB groups.

The DMRS port and/or the DMRS sequence may be briefly referred to as a DMRS in the following.

DMRSs and SSBs may be in a one-to-one correspondence, that is, one DMRS corresponds to one SSB; may be in a one-to-many correspondence, that is, one DMRS corresponds to a plurality of SSBs; or may be in a many-to-one correspondence, that is, a plurality of DMRSs correspond to one SSB. The correspondences between DMRSs and SSBs are configured by the network device for the terminal by using signaling. If the correspondences have not been configured, the correspondence, it may be considered by default that the DMRSs are in a one-to-one correspondence with the SSBs. Alternatively, the correspondences may be determined based on a quantity of DMRSs in a DMRS set associated with each SSB and a quantity of SSBs in an SSB set.

When one DMRS corresponds to a plurality of SSBs, the network device cannot uniquely determine the SSB with the largest RSRP in the SSB set based on a detected DMRS, and can only determine that the SSB with the largest RSRP is in a plurality of SSBs associated with the detected DMRS. Based thereupon, the network device may divide SSBs in the SSB set to classify SSBs with similar beam directions into one group, and notify the terminal of SSB grouping information. The terminal may correspond one DMRS to a group of SSBs. The network device can determine a group of SSBs with similar beam directions by using a detected DMRS and send the msg B on any beam in the group of beams.

Figure 10:
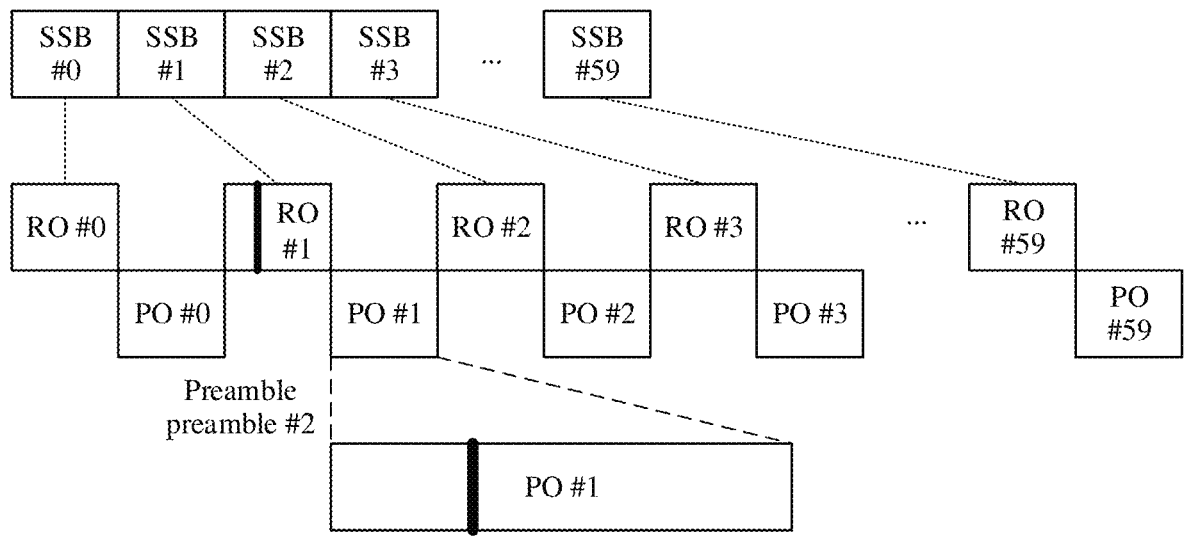
FIG. 10 is a schematic diagram of a seventh indication example of a reference signal according to an embodiment of this application.

As shown in FIG. 10, a total quantity of candidate SSBs in a cell is 64, and a quantity of SSBs actually sent in the cell is 60. In the first layer of correspondence, one SSB is associated with one RO, and each SSB is associated with 12 preambles on one RO. One RO is associated with one PO. One preamble on one RO is associated with four PUSCH resource units (PUSCH resource units, PRUs) on one PO. In the second layer of correspondence, the SSB set is 60 SSBs actually sent in the cell. In the second layer of correspondence, one PRU corresponds to a plurality of SSBs, or one PRU corresponds to a group of SSBs. The PRU is a PO and a DMRS port and/or a DMRS sequence on the PO. Every four PRUs associated with one preamble on one PO are in a one-to-one correspondence with four SSB groups. Each SSB group includes 15 actually sent SSBs. The terminal may randomly select an SSB with an RSRP greater than or equal to the threshold, for example, an SSB #1. Any preamble is selected on an RO #1 associated with the SSB #1, for example, a preamble #2. A PRU corresponding to an SSB group in which the SSB with the largest RSRP is located is selected on four PRUs associated with the preamble #2. For example, if the SSB with the largest RSRP is an SSB #59 and the SSB group in which the SSB with the largest RSRP is located is an SSB group #3, the terminal selects a PRU #3 in four PRUs associated with the preamble #2 on a PO #1. The terminal sends the preamble #2 on the RO #1, and sends the PRU #3 on the PO #1. The network device receives the PRU #3 in the PO #1; determines, based on the PRU #3, that an optimal SSB selected by the terminal is the SSB group #3; and sends the msg B on the beam corresponding to any SSB in the SSB group #3.

By using one example of the third case, the terminal selects a DMRS port and/or a DMRS sequence based on the SSB with the largest RSRP in the SSB set, to implicitly report the SSB with the largest RSRP in the SSB set or an SSB group in which an SSB with a largest RSRP is located. In this way, the terminal may select a beam with an RSRP satisfying a requirement to send the msg A as quickly as possible, and may further report, to the network device, an SSB corresponding to an optimal beam in the SSB set or an SSB group in which an SSB corresponding to an optimal beam is located.

When any plurality of correspondences in the first correspondence to the fourth correspondence that are described above are used in combination, there is another case for the reference signal indication method. On the basis of the first case and the second case, the terminal sends a first codeword on a first time-frequency resource, where the first codeword indicates a reference signal with a largest receive power; or the terminal sends a first codeword and a second codeword on a first time-frequency resource, where the first codeword indicates a first reference signal with a largest receive power. Based thereupon, the terminal may further send a third codeword on a second time-frequency resource associated with the first time-frequency resource. The third codeword corresponds to the first reference signal in a reference signal group. Specifically, the third codeword corresponding to the first reference signal in the codeword group is determined based on correspondences between reference signals in the reference signal group and codewords in a codeword group.

On the basis of the third case, a method for indicating a reference signal in a codeword combination manner is described. The terminal sends the first codeword on the first time-frequency resource, and sends the second codeword on the second time-frequency resource associated with the first time-frequency resource. The second layer of correspondence may be described as correspondences between N reference signals and M codewords. The second codeword has a correspondence with the second reference signal with a largest receive power in the N reference signals. Based thereupon, the second codeword corresponds to a reference signal group in which the second reference signal is located.

The following uses a method for indicating a reference signal in a codeword combination manner based on the third case as an example, and provides descriptions with reference to specific application scenarios.

The terminal selects a preamble and a DMRS port and/or a DMRS sequence based on the SSB with the largest RSRP in the plurality of SSBs, jointly and implicitly reports the SSB with the largest RSRP in the plurality of SSBs by using the preamble and the DMRS port and/or the DMRS sequence.

In an implementation, SSB sets are grouped. SSB groups are in a one-to-one correspondence with preambles in a preamble set, and SSBs in each SSB group are in a one-to-one correspondence with DMRS ports and/or DMRS sequence sets. The terminal selects a preamble in a corresponding preamble set based on an SSB group in which the SSB with the largest RSRP in the SSB set is located. The terminal selects a DMRS in a DMRS set based on the SSB with the largest RSRP in the SSB set. That is, the terminal implicitly reports, by using the selected preamble, the SSB group in which the SSB with the largest RSRP in the SSB set is located, and implicitly reports, by using the selected DMRS port and/or DMRS sequence, the specific SSB with the largest RSRP in the SSB set.

In another implementation, SSB sets are grouped. SSB groups are in a one-to-one correspondence with DMRSs in a DMRS set, and SSBs in each SSB group are in a one-to-one correspondence with preambles in a preamble set. The terminal selects a DMRS in the DMRS set based on an SSB group in which an SSB with a largest RSRP in the SSB set is located, and selects a preamble in the preamble set based on the SSB with the largest RSRP in the SSB set. That is, the terminal implicitly reports, by using the selected DMRS, the SSB group in which the SSB with the largest RSRP in the SSB set is located, and implicitly reports, by using the selected preamble, the specific SSB with the largest RSRP in the SSB set.

The SSB set may be pre-defined, or may be configured by the network device. The SSB set may be all candidate SSBs of a current cell or SSBs actually sent in a cell.

The preamble set may be pre-defined, or may be configured by the network device. The preamble set may be all preambles associated with each SSB in the first layer of correspondence in the foregoing first case. The preamble set may alternatively be all preambles on the ROs that are used for the second layer of correspondence in each RO group in an example of the first case in the second case. The preamble set may alternatively be preambles newly added to each RO in the second case other than the first 64 preambles.

The DMRS set is a DMRS port and/or a DMRS sequence determined by the terminal and used to associate with the preamble in the first layer of correspondence.

Figure 11:
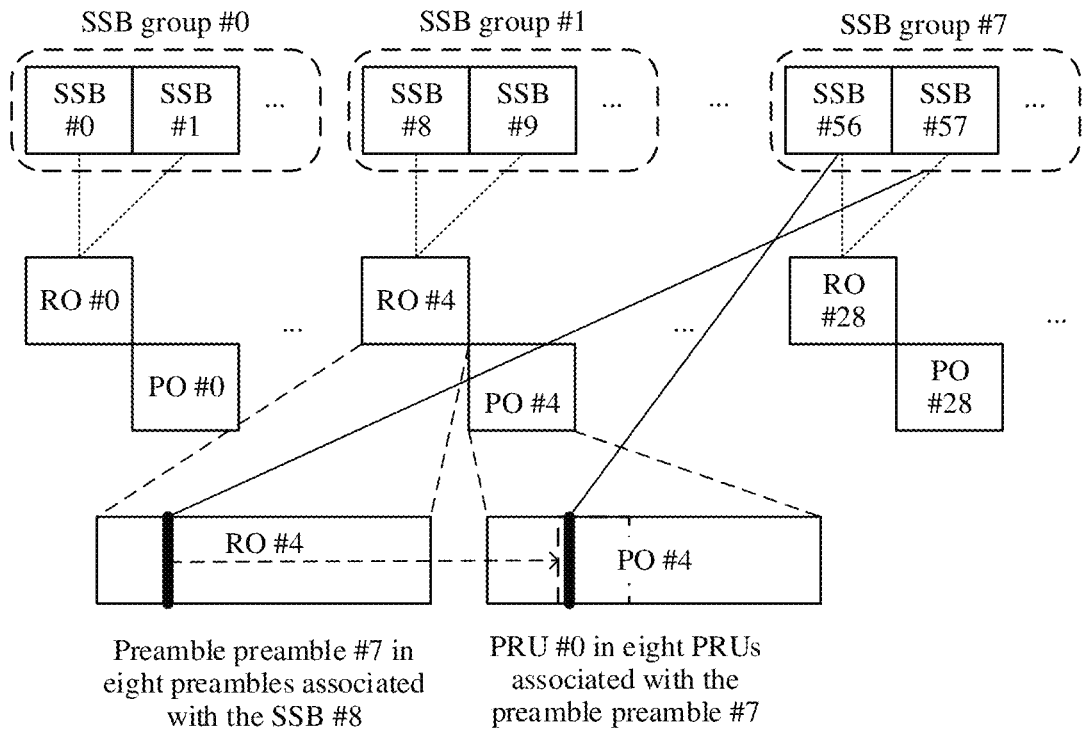
FIG. 11 is a schematic diagram of an eighth indication example of a reference signal according to an embodiment of this application.

As shown in FIG. 11, a total quantity of candidate SSBs in a cell is 64, and a quantity of SSBs actually sent in the cell is 64. In the first layer of correspondence, two SSBs are associated with one RO, and each SSB is associated with 8 preambles on one RO. The 64 actually sent SSBs are divided into eight groups, and eight preambles associated with each SSB are in a one-to-one correspondence with the eight SSB groups. Each preamble is associated with eight PRUs, and the eight PRUs associated with each preamble are in a one-to-one correspondence with eight SSBs in an SSB group associated with the preamble.

The terminal may randomly select an SSB with an RSRP greater than or equal to the threshold, for example, an SSB #8. According to the first layer of correspondence, the SSB #8 is associated with an RO #4 and eight preambles associated on the RO #4. The terminal determines to select the SSB group in which the SSB with the largest RSRP in the 64 SSBs actually sent in the cell is located. The terminal selects, in eight preambles associated with the SSB #8, a preamble corresponding to the SSB group. For example, the SSB with the largest RSRP is an SSB #56. In an SSB group #7, the terminal selects a preamble #7 from the eight preambles associated with the SSB #8 on the RO #4. The terminal selects, from eight PRUs associated with the preamble #7, a PRU associated with the SSB with the largest RSRP, that is, a PRU #0 in the eight PRUs associated with the preamble #7.

The terminal sends the preamble #7 on the RO #4, and sends a PRU #0 on a PO #4 associated with the RO #4. The network device detects a DMRS port and/or a DMRS sequence corresponding to the preamble and the PRU, and sends the msg B on a beam corresponding to an SSB #56. If the network device has transmit/receive beam consistency, the network device may alternatively receive the PUSCH in the msg A on a receive beam corresponding to the SSB #56.

In this application scenario, the terminal selects an RO, a preamble, and a DMRS based on the SSB with the RSRP greater than or equal to the threshold and the SSB with the largest RSRP in the SSB set, to implicitly report the SSB with the largest RSRP in the SSB set. A beam with an RSRP satisfying a requirement may be selected to send the msg A as quickly as possible, or an SSB corresponding to an optimal beam in the SSB set may be reported to the network device.

It should be noted that examples in the application scenarios in this application merely show some possible implementations, to help better understand and describe the method in this application. A person skilled in the art may obtain examples of some evolution forms according to the reference signal indication method provided in this application.

In the foregoing embodiments provided in this application, the method provided in the embodiments of this application is separately described from a perspective of the network device, the terminal device, and interaction between the network device and the terminal device. To implement the functions in the methods provided in the embodiments of this application, the network device and the terminal device may each include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 12:
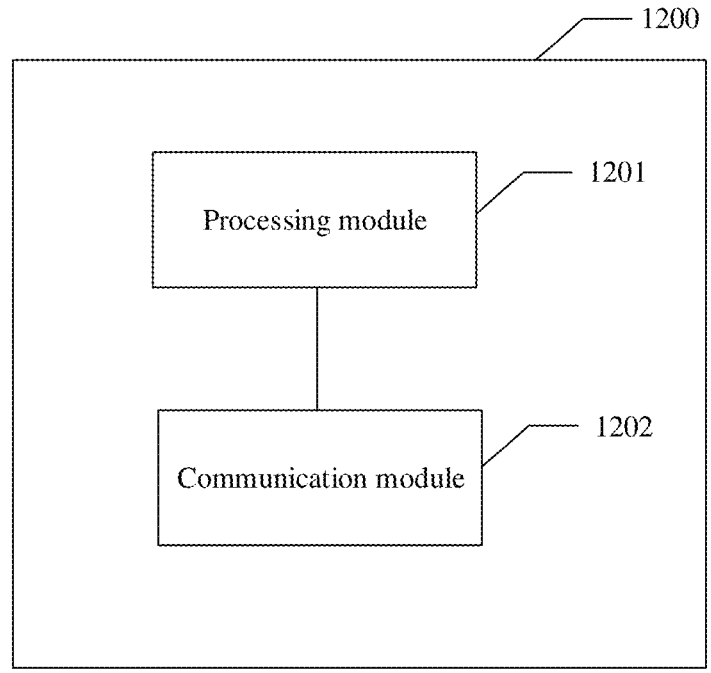
FIG. 12 is a schematic diagram of a structure of an apparatus according to an embodiment of this application.

As shown in FIG. 12, based on a same technical concept, an embodiment of this application further provides an apparatus 1200. The apparatus 1200 may be a terminal device or a network device, an apparatus in a terminal device or a network device, or an apparatus that can be used with a terminal device or a network device. In a design, the apparatus 1200 may include modules for performing the methods/operations/steps/actions performed by the terminal device or the network device in the foregoing method embodiments. The modules may be hardware circuits, may be software, or may be implemented by hardware circuits in combination with software. In a design, the apparatus may include a processing module 1201 and a communication module 1202. The processing module 1201 is configured to invoke the communication module 1202 to perform a function of receiving and/or sending.

When used to perform the method performed by the terminal device,
the communication module 1202 is configured to: receive a plurality of reference signals, and send at least one codeword on a first time-frequency resource, where the at least one codeword may be one or more codewords. The at least one codeword includes a first codeword, the first codeword has a correspondence with a to-be-reported first reference signal in N reference signals, and the N reference signals are a subset of the plurality of reference signals.

Alternatively, the communication module 1202 is configured to: receive a plurality of reference signals; and send a first codeword on a first time-frequency resource, and send a second codeword on a second time-frequency resource associated with the first time-frequency resource, where the second codeword has a correspondence with a to-be-reported second reference signal in N reference signals, the N reference signals are a subset of the plurality of reference signals, and N is a positive integer.

The processing module 1201 and the communication module 1202 may be further configured to perform another corresponding step or operation performed by the terminal device in the foregoing method embodiments. Details are not described herein again.

When used to perform the method performed by the network device,
the processing module 1201 is configured to: send a plurality of reference signals to a terminal; receive a first codeword from the terminal on a first time-frequency resource, where the first codeword has a correspondence with a to-be-reported first reference signal in the N reference signals, the N reference signals are a subset of the plurality of reference signals, and N is a positive integer; and send data to the terminal on a beam corresponding to the first reference signal.

The processing module 1201 and the communication module 1202 may be further configured to perform another corresponding step or operation performed by the network device in the foregoing method embodiments. Details are not described herein again.

Division into modules in the embodiments of this application is an example, is only logical function division, and may be other division during actual implementation. In addition, functional modules in the embodiments of this application may be integrated into one processor, or may exist alone physically, or two or more modules may be integrated into one module. The integrated module may be implemented in a form of hardware, or may be implemented in a form of a software function module.

Figure 13:
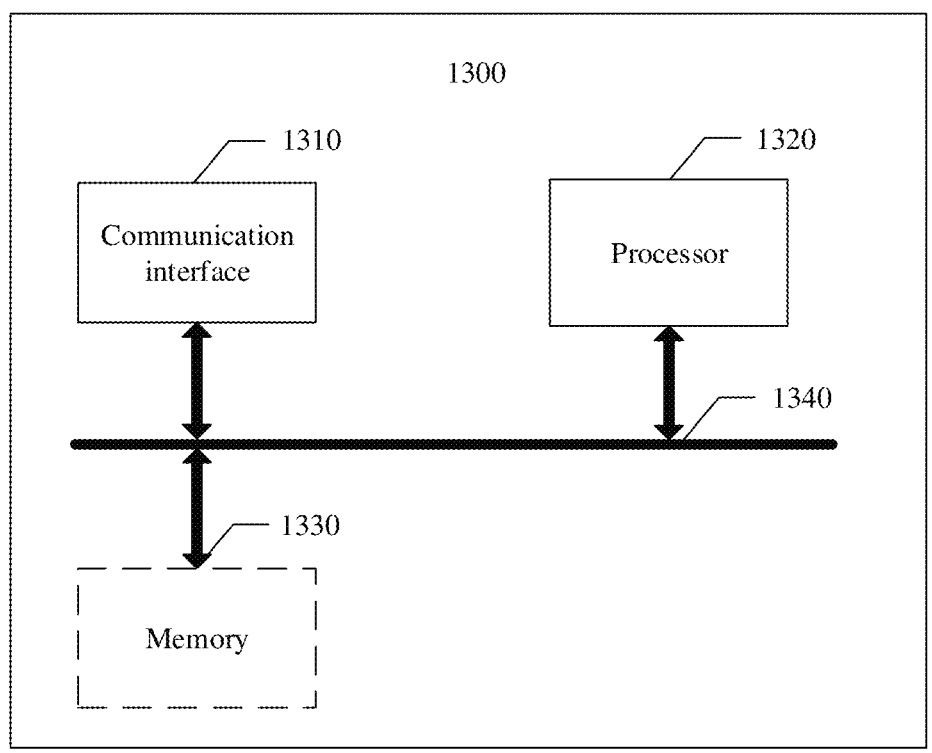
FIG. 13 is a schematic diagram of a structure of another apparatus according to an embodiment of this application.

FIG. 13 shows an apparatus 1300 according to an embodiment of this application. The apparatus 1300 is configured to implement a function of the terminal device or the network device in the foregoing method. When implementing the function of the network device, the apparatus may be the network device, may be an apparatus in the network device, or an apparatus that can be used with the network device. When the function of the terminal device is implemented, the apparatus may be a terminal device, an apparatus in a terminal device, or an apparatus that can be used together with a terminal device. The apparatus may be a chip system. In the embodiments of this application, the chip system may include a chip, or may include a chip and another discrete component. The apparatus 1300 includes at least one processor 1320, configured to implement the function of the terminal device or the network device in the method provided in the embodiments of this application. The apparatus 1300 may further include a communication interface 1310. In the embodiments of this application, the communication interface may be a transceiver, a circuit, a bus, a module, or a communication interface of another type, and is configured to communicate with another device through a transmission medium. For example, the communication interface 1310 is used by an apparatus in the apparatus 1300 to communicate with another device. For example, when the apparatus 1300 is a network device, the another device may be a terminal device. When the apparatus 1300 is a terminal device, the another apparatus may be a network device. The processor 1320 receives and sends data by using the communication interface 1310, and is configured to implement the method described in the foregoing method embodiment. For example, when implementing the function of the network device, the processor 1320 is configured to: send a plurality of reference signals to a terminal by using the communication interface; receive a first codeword from the terminal on a first time-frequency resource, where the first codeword has a correspondence with a to-be-reported first reference signal in the N reference signals, the N reference signals are a subset of the plurality of reference signals, and N is a positive integer; and send data to the terminal on a beam corresponding to the first reference signal. When implementing the function of the terminal device, the processor 1320 is configured to: receive a plurality of reference signals by using the communication interface, and send at least one codeword on the first time-frequency resource, where the at least one codeword includes a first codeword, the first codeword has a correspondence with a to-be-reported first reference signal in N reference signals, and the N reference signals are a subset of the plurality of reference signals. Alternatively, when implementing the function of the terminal device, the processor 1320 is configured to: receive a plurality of reference signals by using the communication interface; and send a first codeword on a first time-frequency resource, and send a second codeword on a second time-frequency resource associated with the first time-frequency resource, where the second codeword has a correspondence with a to-be-reported second reference signal in N reference signals, the N reference signals are a subset of the plurality of reference signals, and N is a positive integer. The processor 1320 and the communication interface 1310 may further be configured to perform another corresponding steps or operation performed by the terminal device or the network device in the foregoing method embodiment. Details are not described herein again.

The apparatus 1300 may further include at least one memory 1330, configured to store program instructions and/or data. The memory 1330 is coupled to the processor 1320. The coupling in the embodiments of this application is indirect coupling or a communication connection between apparatuses, units, or modules for information exchange between the apparatuses, the units, or the modules, and may be in electrical, mechanical, or another form. The processor 1320 may operate in collaboration with the memory 1330. The processor 1320 may execute the program instructions stored in the memory 1330. At least one of the at least one memory may be included in the processor.

In the embodiments of this application, a specific connection medium between the communication interface 1310, the processor 1320, and the memory 1330 is not limited. In this embodiment of this application, in FIG. 13, the memory 1330, the communication interface 1320, and a transceiver 1310 are connected by using a bus 1340. The bus is indicated by using a bold line in FIG. 13. A connection manner between other components is merely an example for description, and is not limited by reference. The bus may be classified into an address bus, a data bus, a control bus, and the like. For ease of representation, only one thick line is used to represent the bus in FIG. 13, but this does not mean that there is only one bus or only one type of bus.

When the apparatus 1200 and the apparatus 1300 are specifically chips or chip systems, the communication module 1202 and the communication interface 1310 may output or receive baseband signals. When the apparatus 1200 and the apparatus 1300 are specifically devices, the communication module 1202 and the communication interface 1310 may output or receive radio frequency signals. In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed in the embodiments of this application may be directly performed by a hardware processor, or may be performed by a combination of hardware in the processor and a software module.

In the embodiments of this application, the memory may be a nonvolatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some preferred embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

Clearly, the person skilled in the art can make various modifications and variations to the embodiments of this application without departing from the spirit and scope of the embodiments of this application. In this way, this application is intended to cover these modifications and variations of the embodiments of this application provided that they fall within the scope of protection defined by the following claims and their equivalent technologies.

What is claimed is:

1. A reference signal indication method, comprising:
   receiving a plurality of reference signals;
   sending at least one codeword on a first time-frequency resource, wherein the at least one codeword comprises a first codeword, the first codeword corresponds to a first reference signal in N reference signals of the plurality of reference signals, the first reference signal is a selected reference signal, the N reference signals are a subset of the plurality of reference signals, and N is a positive integer; and
   determining, based on the N reference signals of the plurality of reference signals and M corresponding codewords, the first codeword corresponding to the first reference signal, wherein the M codewords are a subset of codewords associated with the first time-frequency resource, and M is a positive integer;
   wherein the N reference signals of the plurality of reference signals are each of candidate reference signals of a cell,
   the N reference signals of the plurality of reference signals are reference signals sent in the cell,
   the N reference signals of the plurality of reference signals are a subset of each of the candidate reference signals of the cell, or
   the N reference signals of the plurality of reference signals are a subset of the reference signals sent in the cell.

2. The method according to claim 1, wherein the first reference signal in the N reference signals of the plurality of reference signals has a receive power that is greater than a corresponding receive power of the N reference signals of the plurality of reference signals.

3. The method according to claim 1, wherein the first time-frequency resource corresponds to a second reference signal in the N reference signals of the plurality of reference signals has a receive power greater than or equal to a threshold of the plurality of reference signals.

4. The method according to claim 1, wherein the method further comprises:
   determining, based on N1 reference signals and P corresponding time-frequency resources, the first time-frequency resource corresponding to a second reference signal, wherein N1 and P are positive integers, the N1 reference signals comprise the plurality of reference signals, and the first time-frequency resource is one of the P time-frequency resources.

5. The method according to claim 1, wherein the at least one codeword further comprises a second codeword; and
   the sending at least one codeword on a first time-frequency resource comprises:
   sending the first codeword and the second codeword on the first time-frequency resource.

6. The method according to claim 5, wherein the first codeword and the second codeword belong to different corresponding codeword sets.

7. The method according to claim 1, wherein M<N, the N reference signals of the plurality of reference signals belong to a plurality of reference signal groups,
   each reference signal of the N reference signals of the plurality of reference signals belongs to a corresponding reference signal group, and
   the first codeword corresponds to a reference signal group of the plurality of reference signal groups in which the first reference signal is located.

8. The method according to claim 7, wherein the method further comprises:
   sending a second codeword on a second time-frequency resource associated with the first time-frequency resource, wherein
   the second codeword corresponds to the first reference signal in the reference signal group.

9. The method according to claim 8, wherein the method further comprises:
   determining, based on the reference signals in the reference signal group in which the first reference signal is located and corresponding codewords in a codeword group,
   the second codeword in the codeword group corresponding to the first reference signal in the first reference signal group.

10. A communication apparatus, comprising:
    a receiver configured to receive a plurality of reference signals;
    a transmitter configured to send at least one codeword on a first time-frequency resource, wherein the at least one codeword comprises a first codeword, the first codeword corresponds to a first reference signal in N reference signals of the plurality of reference signals, the first reference signal is a selected reference signal, the N reference signals are a subset of the plurality of reference signals, and N is a positive integer; and a processor configured to determine, based on the N reference signals of the plurality of reference signals and M corresponding codewords, the first codeword corresponding to the first reference signal, wherein the M codewords are a subset of codewords associated with the first time-frequency resource, and M is a positive integer;

wherein the N reference signals of the plurality of reference signals are each of candidate reference signals of a cell, the N reference signals of the plurality of reference signals are reference signals sent in the cell, the N reference signals of the plurality of reference signals are a subset of each of the candidate reference signals of the cell, or the N reference signals of the plurality of reference signals are a subset of the reference signals sent in the cell.

11. The apparatus according to claim 10, wherein the first reference signal in the N reference signals of the plurality of reference signals has a receive power that is greater than a corresponding receive power of the N reference signals of the plurality of reference signals.

12. The apparatus according to claim 10, wherein the first time-frequency resource corresponds to a second reference signal in the N reference signals of the plurality of reference signals has a receive power greater than or equal to a threshold of the plurality of reference signals.

13. The apparatus according to claim 10, further comprising:

a processor configured to determine, based on N1 reference signals and P corresponding time-frequency resources, the first time-frequency resource corresponding to a second reference signal, wherein N1 and P are positive integers, the N1 reference signals comprise the plurality of reference signals, and the first time-frequency resource is one of the P time-frequency resources.

14. The apparatus according to claim 10, wherein the at least one codeword further comprises a second codeword; and the transmitter configured to send the at least one codeword on the first time-frequency resource, the transmitter is further configured to:

send the first codeword and the second codeword on the first time-frequency resource.

15. The apparatus according to claim 14, wherein the first codeword and the second codeword belong to different corresponding codeword sets.

16. A non-transitory computer-readable storage medium, wherein the non-transitory computer storage medium stores computer readable instructions; and in response to the computer readable instructions are executed on a communication apparatus, causes the communication apparatus to:

receive a plurality of reference signals;

send at least one codeword on a first time-frequency resource, wherein the at least one codeword comprises a first codeword, the first codeword corresponds to a first reference signal in N reference signals of the plurality of reference signals, the first reference signal is a selected reference signal, the N reference signals are a subset of the plurality of reference signals, and N is a positive integer; and determine, based on the N reference signals of the plurality of reference signals and M corresponding codewords, the first codeword corresponding to the first reference signal, wherein the M codewords are a subset of codewords associated with the first time-frequency resource, and M is a positive integer;

wherein the N reference signals of the plurality of reference signals are each of candidate reference signals of a cell, the N reference signals of the plurality of reference signals are reference signals sent in the cell, the N reference signals of the plurality of reference signals are a subset of each of the candidate reference signals of the cell, or the N reference signals of the plurality of reference signals are a subset of the reference signals sent in the cell.

* * * * *